United States Patent

Chai

(10) Patent No.: US 12,289,656 B2
(45) Date of Patent: Apr. 29, 2025

(54) METHOD AND SYSTEM FOR PERFORMING CHARGING PROCESSING ON NETWORK SLICE CUSTOMER, AND RELATED DEVICE

(71) Applicant: HUAWEI TECHNOLOGIES CO., LTD., Guangdong (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 775 days.

(21) Appl. No.: 17/465,526

(22) Filed: Sep. 2, 2021

(65) Prior Publication Data

US 2021/0400445 A1 Dec. 23, 2021

Related U.S. Application Data

(63) Continuation of application No. PCT/CN2020/073490, filed on Jan. 21, 2020.

(30) Foreign Application Priority Data

Mar. 7, 2019 (CN) .......................... 201910172470.9

(51) Int. Cl.
*H04W 4/24* (2024.01)
*H04W 24/08* (2009.01)
(Continued)

(52) U.S. Cl.
CPC ............. *H04W 4/24* (2013.01); *H04W 24/08* (2013.01); *H04W 80/02* (2013.01); *H04W 88/18* (2013.01)

(58) Field of Classification Search
CPC ..... H04W 48/18; H04W 76/12; H04W 76/11; H04W 60/04; H04W 28/24; H04W 4/24
See application file for complete search history.

(56) References Cited

U.S. PATENT DOCUMENTS

2019/0044602 A1 2/2019 Cui et al.
2019/0044980 A1 2/2019 Russell et al.
(Continued)

FOREIGN PATENT DOCUMENTS

CN 107919969 A 4/2018
CN 108401231 A 8/2018
(Continued)

OTHER PUBLICATIONS

Huawei, "Addition of solution for event based charging", 3GPP TSG-SA5 Meeting #124 S5-192291, Taipei, Taiwan, Feb. 25-Mar. 1, 2019, Total 3 Pages.
(Continued)

*Primary Examiner* — Kwasi Karikari

(57) ABSTRACT

A method for performing charging processing on a network slice customer includes: receiving a first charging request message including session information from a session management device, where the session information includes an attribute of a PDU session of a user equipment on a network slice instance; determining that charging processing is to be performed on a target network slice customer for the PDU session; and sending a second charging request message including an identifier of the target network slice customer and the session information to a network slice customer charging device, so that the network slice customer charging device performs charging processing on the target network slice customer for the PDU session. When the second charging request message further includes service unit information, the charging processing includes storing service unit usage information or granting a service unit quota.

20 Claims, 7 Drawing Sheets

(51) Int. Cl.
*H04W 80/02* (2009.01)
*H04W 88/18* (2009.01)

(56) References Cited

U.S. PATENT DOCUMENTS

| | | | |
|---|---|---|---|
| 2019/0053147 | A1 | 2/2019 | Qiao et al. |
| 2020/0267786 | A1* | 8/2020 | Qiao .................... H04W 16/02 |
| 2021/0184875 | A1* | 6/2021 | Qiao .................... H04M 15/66 |

FOREIGN PATENT DOCUMENTS

| | | |
|---|---|---|
| CN | 108605032 A | 9/2018 |
| CN | 108632775 A | 10/2018 |
| CN | 109218032 A | 1/2019 |
| EP | 3337205 A1 | 6/2018 |
| WO | 2018031638 A1 | 2/2018 |
| WO | 2018145475 A1 | 8/2018 |

OTHER PUBLICATIONS

Huawei et al., "Addition of a few editorial corrections and many clarifications between NWSlice and NW Slice Instance", 3GPP TSG-SAS Meeting #124 S5-192295, Taipei, Taiwan Feb. 25-Mar. 1, 2019, Total 6 Pages.

* cited by examiner

METHOD AND SYSTEM FOR PERFORMING CHARGING PROCESSING ON NETWORK SLICE CUSTOMER, AND RELATED DEVICE

CROSS-REFERENCE TO RELATED APPLICATIONS

This disclosure is a continuation of International Application No. PCT/CN2020/073490, filed on Jan. 21, 2020, which claims priority to Chinese Patent Application No. 201910172470.9, filed on Mar. 7, 2019, The disclosures of the aforementioned applications are hereby incorporated by reference in their entireties.

TECHNICAL FIELD

This application relates to the communications field, and in particular, to a method and system for performing charging processing on a network slice customer, and a related device.

BACKGROUND

In a 5G (fifth generation) network, to implement traffic grouping, tenant isolation, and macro-level resource configuration, a physical network may be divided into end-to-end networks to form network slices. A network slice is essentially a virtual network running on a shared physical network infrastructure. On the physical network, an operator can create virtual networks (each is correspondingly one network slice instance, NSI) that meet corresponding service requirements (such as latency, bandwidth, security, and reliability), for customers with different requirements for network features. This improves utilization of network resources and quality of service of network services.

An operator of the 5G network may lease a same network slice instance to a plurality of large customers for use, or may lease a plurality of network slice instances to a same large customer. Then, the large customer provides the same network slice instance or the plurality of network slice instances to a large quantity of users (user equipments) for use. Such a large customer is referred to as a network slice customer, or is sometimes referred to as a network slice industry customer, or even referred to as an industry customer for short. Common network slice customers include a power grid company, a railway company, another company that has particular requirements on networks, and the like. A network slice customer may be charged based on usage of a network slice instance, for example, charged based on total data traffic or total duration consumed on one or more network slice instances in a charging period. In view of this, according to the current 3GPP (3rd Generation Partnership Project) specifications, a session management function (SMF) device in a network slice instance reports information such as usage of a user equipment to a charging function (CHF) device, and then the CHF device performs charging processing on a corresponding industry customer.

Information such as usage of a user equipment of a common user (namely, an individual customer, or a user who is not a network slice customer) also needs to be reported by the SMF device to the CHF device, and then the CHF device performs charging processing on the common user. In addition, a plurality of SMF devices may be deployed for one network slice instance for various reasons (for example, to differentiate access points or share load). Therefore, when a large quantity of user equipments of a same network slice customer simultaneously initiate PDU session establishment requests to a plurality of SMF devices on a network slice instance, and the plurality of SMF devices simultaneously initiate charging requests to a plurality of CHF devices, if charging processing needs to be performed on the network slice customer, the plurality of CHF devices have to coordinate with each other (because charging processing needs to be performed on the same network slice customer). This greatly reduces charging processing performance of each CHF device, and reduces user experience in use of a user equipment (user equipment of a user of the network slice customer or user equipment of a common user).

SUMMARY

In view of this, it is necessary to provide a method for performing charging processing on a network slice customer, to improve charging processing performance of a CHF device, and further improve user experience on a user equipment side.

According to a first aspect, an embodiment of this application provides a system for performing charging processing on a network slice customer, including: a session management device, a network slice charging gateway, and a network slice customer charging device.

The session management device is configured to:
send a first charging request message to the network slice charging gateway, where the first charging request message includes session information, and the session information includes an attribute of a protocol data unit PDU session of a user equipment on a network slice instance.

The network slice charging gateway is configured to:
receive the first charging request message from the session management device;
determine, based on the first charging request message, that charging processing is to be performed on a target network slice customer for the PDU session, where the target network slice customer is a network slice customer on which charging processing is to be performed for the PDU session; and
send a second charging request message to the network slice customer charging device, where the second charging request message includes an identifier of the target network slice customer and the session information.

The network slice customer charging device is configured to:
receive the second charging request message from the network slice charging gateway; and
perform charging processing on the target network slice customer for the PDU session based on the second charging request message.

In the system, when a large quantity of user equipments of a same network slice customer concurrently trigger charging requests to a plurality of session management devices, and then the plurality of session management devices concurrently initiate charging requests to a plurality of network slice charging gateways, the plurality of network slice charging gateways can transfer some charging processing tasks to a same network slice customer charging device for execution. In this way, load of the network slice charging gateways can be shared, and performance of each network slice charging gateway can be improved by avoiding coordination between the plurality of network slice charging gateways. In addition, because charging processing for a same network slice customer is performed on a same network slice customer charging device, a charging processing error can be avoided, and accuracy of charging processing performed on the network slice customer can be improved.

In a possible solution, the first charging request message and the second charging request message further include service unit information, and the service unit information includes information used by the session management device to request a service unit for the PDU session or information used by the session management device to report a quantity of used service units in the PDU session.

In a possible solution, the network slice customer charging device is further configured to send a charging processing result to the network slice charging gateway; the network slice charging gateway is further configured to receive the charging processing result from the network slice customer charging device, and send the charging processing result to the session management device; and the session management device is further configured to receive the charging processing result from the network slice charging gateway, and control the PDU session based on the charging processing result.

According to a second aspect, an embodiment of this application provides a method for performing charging processing on a network slice customer, where the method is used in a network slice charging gateway, and the method includes:

receiving a first charging request message from a session management device, where the first charging request message includes session information, and the session information includes an attribute of a protocol data unit PDU session of a user equipment on a network slice instance;

determining, based on the first charging request message, that charging processing is to be performed on a target network slice customer for the PDU session, where the target network slice customer is a network slice customer on which charging processing is to be performed for the PDU session; and sending a second charging request message to a network slice customer charging device, where the second charging request message includes an identifier of the target network slice customer and the session information.

In a possible solution, the determining, based on the first charging request message, that charging processing is to be performed on the target network slice customer for the PDU session specifically includes:

determining the identifier of the target network slice customer based on the first charging request message; and determining that charging processing is to be performed on the target network slice customer for the PDU session.

In a possible solution, before the sending a second charging request message to a network slice customer charging device, the method further includes:

determining an address of the network slice customer charging device.

In a possible solution, the determining an address of the network slice customer charging device specifically includes:

determining the address of the network slice customer charging device based on preset configuration information or the identifier of the target network slice customer.

In a possible solution, the session information includes a user identifier, and the determining the identifier of the target network slice customer based on the first charging request message specifically includes:

determining the identifier of the target network slice customer based on the user identifier.

In a possible solution, the session information includes a user identifier and an identifier of the network slice instance, and the determining the identifier of the target network slice customer based on the first charging request message specifically includes:

determining the identifier of the target network slice customer based on the user identifier and the identifier of the network slice instance; or determining the identifier of the target network slice customer based on the user identifier, the identifier of the network slice instance, and a time at which the first charging request message is received.

In a possible solution, the session information includes a user identifier, an identifier of the network slice instance, and a creation time of the PDU session, and the determining the identifier of the target network slice customer based on the first charging request message specifically includes:

determining the identifier of the target network slice customer based on the user identifier, the identifier of the network slice instance, and the creation time of the PDU session.

In a possible solution, the session information includes a user identifier, an identifier of the network slice instance, and a service identifier, and the determining the identifier of the target network slice customer based on the first charging request message specifically includes:

determining the identifier of the target network slice customer based on the user identifier, the identifier of the network slice instance, and the service identifier.

In a possible solution, the method further includes:

generating a charging session identifier, where the charging session identifier is used to identify a charging session between the network slice charging gateway and the network slice customer charging device, and the charging session is used for charging processing for the PDU session; and storing a correspondence between the charging session identifier and the identifier of the target network slice customer and/or the address of the network slice customer charging device.

In a possible solution, the method further includes:

receiving, from the session management device, the first charging request message including the charging session identifier; and obtaining the identifier of the target network slice customer and/or the address of the network slice customer charging device based on the charging session identifier and the correspondence.

In a possible solution, the first charging request message and the second charging request message further include service unit information, and the service unit information includes information used by the session management device to request a service unit for the PDU session or information used by the session management device to report a quantity of used service units in the PDU session.

In a possible solution, the service unit information includes a used service unit quota, and the used service unit quota is the quantity of used service units in the PDU session.

In a possible solution, the method further includes:
receiving, from the network slice customer charging device, a processing result of the used service unit quota, and sending the processing result to the session management device.

In a possible solution, the service unit information includes a requested service unit quota and a used service unit quota, and the method further includes:
receiving, from the network slice customer charging device, a service unit quota granted by the network slice customer charging device in response to the second charging request message, and sending the service unit quota to the session management device.

According to a third aspect, an embodiment of this application provides a method for performing charging processing on a network slice customer, where the method is used in a network slice customer charging device, and the method includes:
receiving a second charging request message from a network slice charging gateway, where the second charging request message includes an identifier of a target network slice customer and session information, the session information includes an attribute of a protocol data unit PDU session of a user equipment on a network slice instance, and the target network slice customer is a network slice customer on which charging processing is to be performed for the PDU session; and
performing charging processing on the target network slice customer for the PDU session based on the second charging request message.

In a possible solution, the second charging request message further includes service unit information, and the service unit information includes information used by the session management device to request a service unit for the PDU session or to report a quantity of used service units in the PDU session; and the performing charging processing on the target network slice customer for the PDU session based on the second charging request message specifically includes:
performing charging processing on the target network slice customer for the PDU session based on the session information and the service unit information.

In a possible solution, the service unit information includes a used service unit quota, and the used service unit quota is a quantity of used service units in the PDU session; and the performing charging processing on the target network slice customer for the PDU session based on the session information and the service unit information specifically includes:
storing the identifier of the target network slice customer, the session information, and the used service unit quota in a charging data record of the target network slice customer.

In a possible solution, the method further includes:
sending a processing result of the used service unit quota to the network slice charging gateway.

In a possible solution, the service unit information includes a requested service unit quota and used service unit quota, and the performing charging processing on the target network slice customer for the PDU session based on the session information and the service unit information specifically includes:
deducting the used service unit quota from an available service unit quantity of the target network slice customer, to obtain a remaining available service unit quantity of the target network slice customer;
determining a granted service unit quota based on the requested service unit quota and the remaining available service unit quantity of the target network slice customer; and
sending the granted service unit quota to the network slice charging gateway.

In a possible solution, the session information includes an initial flag, and the initial flag is used to indicate that the PDU session is a newly created PDU session or a PDU session for which no charging processing has been performed; and the performing charging processing on the target network slice customer for the PDU session based on the second charging request message specifically includes:
calculating an updated PDU session quantity of the target network slice customer based on the identifier of the target network slice customer and the initial flag.

In a possible solution, the session information includes a start time of the PDU session, and the performing charging processing on the target network slice customer for the PDU session based on the second charging request message specifically includes:
calculating an updated PDU session quantity of the target network slice customer based on the identifier of the target network slice customer and the start time of the PDU session.

In a possible solution, the performing charging processing on the target network slice customer for the PDU session based on the second charging request message specifically includes: determining that the updated PDU session quantity of the target network slice customer reaches a subscribed PDU session quantity of the target network slice customer; and
sending indication information indicating to terminate the PDU session to the network slice charging gateway;
or further includes:
determining that the updated PDU session quantity of the target network slice customer does not reach a subscribed PDU session quantity of the target network slice customer; and
sending indication information indicating to maintain the PDU session to the network slice charging gateway.

In a possible solution, the session information includes a user identifier, and the performing charging processing on the target network slice customer for the PDU session based on the second charging request message specifically includes:
obtaining a subscribed quantity of the target network slice customer, and calculating an updated user quantity of the target network slice customer based on the user identifier;
determining that the updated user quantity of the target network slice customer reaches the subscribed quantity of the target network slice customer; and
sending indication information indicating to terminate the PDU session to the network slice charging gateway;
or specifically includes:
obtaining a subscribed quantity of the target network slice customer, and calculating an updated user quantity of the target network slice customer based on the user identifier; determining that the updated user quantity of the target network slice customer does not reach the subscribed quantity of the target network slice customer; and
sending indication information indicating to maintain the PDU session to the network slice charging gateway.

According to a fourth aspect, an embodiment of this application provides a network slice charging gateway, including a processor and a memory. The memory is configured to store program instructions. The processor is configured to invoke and execute the program instructions stored in the memory, so that the network slice charging gateway is enabled to perform the method for performing charging processing on a network slice customer according to the second aspect and any possible implementation of the second aspect.

According to a fifth aspect, an embodiment of this application provides a computer-readable storage medium, including instructions. When the instructions are run on a computer, the computer is enabled to perform the method for performing charging processing on a network slice customer according to the second aspect and any possible implementation of the second aspect.

According to a sixth aspect, an embodiment of this application provides a network slice customer charging device, including a processor and a memory. The memory is configured to store program instructions. The processor is configured to invoke and execute the program instructions stored in the memory, so that the network slice customer charging device is enabled to perform the method for performing charging processing on a network slice customer according to the third aspect and any possible implementation of the third aspect.

According to a seventh aspect, an embodiment of this application provides a computer-readable storage medium, including instructions. When the instructions are run on a computer, the computer is enabled to perform the method for performing charging processing on a network slice customer according to the third aspect and any possible implementation of the third aspect.

According to an eighth aspect, an embodiment of this application provides a chip. The chip includes a programmable logic circuit and/or program instructions, and the chip is configured to implement the method in any one of the second aspect, the possible implementations of the second aspect, the third aspect, or the possible implementations of the third aspect when running.

DESCRIPTION OF EMBODIMENTS

The following describes technical solutions in embodiments of this application with reference to the accompanying drawings in the embodiments of this application.

Figure 1A:
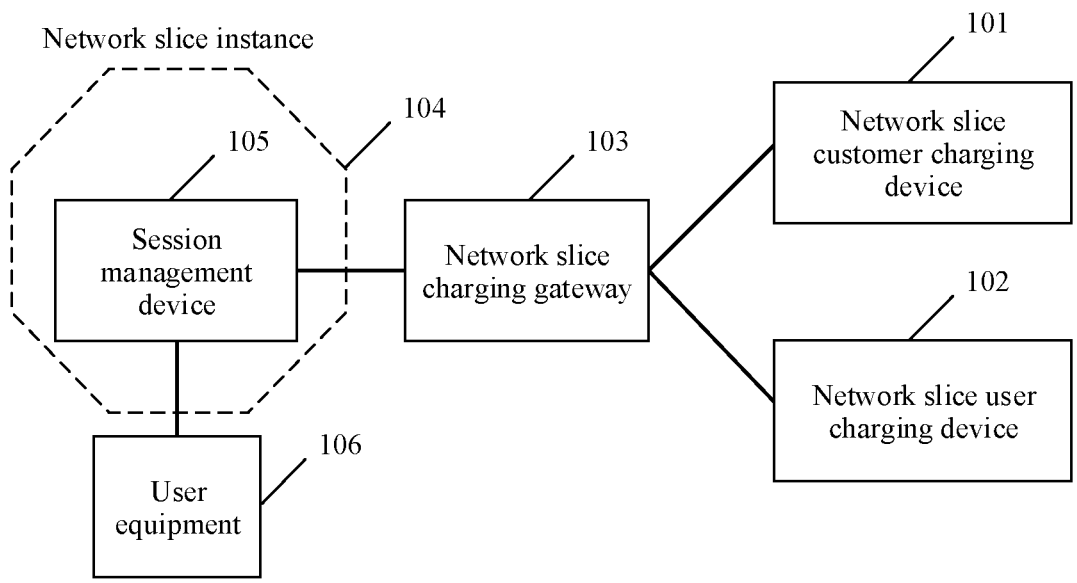
FIG. 1A is an architectural diagram of a charging system according to an embodiment of this application.

FIG. 1A is an architectural diagram of a charging system according to an embodiment of this application. The charging system includes a network slice customer charging device 101, a network slice user charging device 102, a network slice charging gateway 103, a network slice instance 104, a session management device 105, and a user equipment 106, which are respectively described as follows:

The network slice charging gateway 103 is at least configured to receive a charging request message from the session management device 105, and request a corresponding charging device to perform charging processing, which includes the following steps: receiving a first charging request message from the session management device 105, where the first charging request message includes session information, and the session information includes at least one attribute (for example, a user identifier, user location information, a PDU session identifier, and an identifier of a network slice instance) of a protocol data unit (PDU) session of the user equipment 106 on the network slice instance 104; and if the network slice charging gateway 103 determines, based on the first charging request message received from the session management device 105, that charging processing is to be performed on a target network slice customer (the target network slice customer is a network slice customer on which charging processing is to be performed for the PDU session) for the PDU session, sending a second charging request message to the network slice customer charging device 101, where the second charging request message includes an identifier of the target network slice customer and the session information, so that the network slice customer charging device 101 performs charging processing on the target network slice customer for the PDU session; or if the network slice charging gateway 103 determines that the network slice user charging device 102 is to perform charging processing on a user corresponding to the user equipment 106 for the PDU session, sending a third charging request message to the network slice user charging device 102, where the third charging request message includes the session information, so that the network slice user charging device 102 perform charging processing on the user for the PDU session. Optionally, the first charging request message, the second charging request message, or the third charging request message may further include service unit information. Then, the network slice customer charging device 101 or the network slice user charging device 102 may perform charging processing based on the service unit information, for example, storing service unit usage information or determining a granted service unit quota. The service unit information includes information used by the session management device to request a service unit (or referred to as a service data unit) for the PDU session or information used by the session management device to report a quantity of used service units in the PDU session.

It may be understood that a function of the network slice charging gateway 103 may be deployed in an independent physical device, or may be deployed in an existing charging device. This is not limited in this embodiment of this application. For example, a function of the network slice charging gateway 103 (referred to as a "network slice charging gateway function") in this embodiment of this application may be deployed in a charging function (CHF) device defined in the 3GPP specification, as shown in a CHF device in FIG. 1B.

It may be understood that, during actual application, FIG. 1A may include more network slice charging gateways, and one network slice charging gateway may further correspond to a plurality of network slice instances, or a plurality of network slice charging gateways correspond to one network slice instance. In this way, a problem such as a single point of failure can be avoided, load sharing can be implemented, and system availability can be improved.

The network slice customer charging device 101 is at least configured to receive a second charging request message from the network slice charging gateway 103 (the second charging request message includes the foregoing identifier of the target network slice customer and the foregoing session information) and perform charging processing on the target network slice customer for the PDU session (used by the user equipment 106) based on the second charging request message. Optionally, if the second charging request message further includes the foregoing service unit information, the network slice customer charging device 101 may be further configured to perform charging processing (for example, grant a service unit quota) on the target network slice customer based on the service unit information. Optionally, the network slice customer charging device 101 may be further configured to send a corresponding charging processing result to the network slice charging gateway 103.

It may be understood that a function of the network slice customer charging device 101 may be deployed in an independent physical device, or may be deployed in an existing charging device. This is not limited in this embodiment of this application. For example, a function of the network slice customer charging device 101 (referred to as a "network slice customer charging function") in this embodiment of this application may be deployed in a network slice charging function (NSCF) device, as shown by an NSCF device in FIG. 1B.

It may be understood that, during actual application, FIG. 1A may include more network slice customer charging devices. However, to avoid coordination between a plurality of network slice customer charging devices, the network slice charging gateway may store a routing rule (including a correspondence between an identifier of the network slice customer and an address of the charging device of a network slice customer), to send or route charging requests (for example, the foregoing second charging request message) for a same network slice customer to a same network slice customer charging device for processing.

The network slice user charging device 102 is at least configured to: receive a third charging request message from the network slice charging gateway 103, where the third charging request message includes the foregoing session information, and perform charging processing on the user (namely, the user corresponding to the user equipment 106) for the PDU session based on the third charging request message. Optionally, if the third charging request message further includes the foregoing service unit information, the network slice user charging device 102 may be further configured to perform charging processing on the user based on the service unit information. Optionally, the network slice user charging device 102 may be further configured to send a corresponding charging processing result to the network slice charging gateway 103.

Figure 1B:
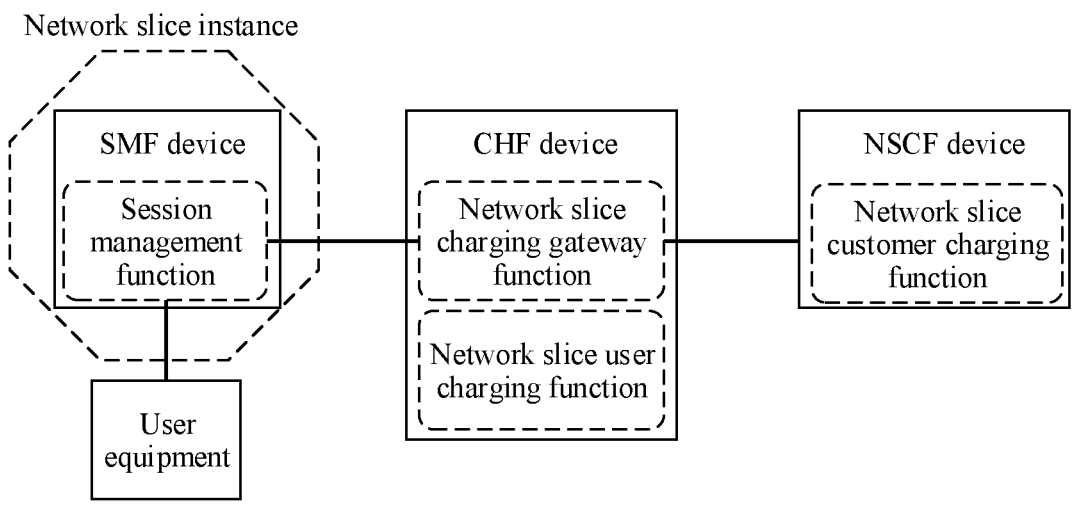
FIG. 1B is an architectural diagram of another charging system according to an embodiment of this application.

It may be understood that a function of the network slice user charging device 102 may be deployed in an independent physical device, or may be deployed in an existing charging device. This is not limited in this embodiment of this application. For example, a function of the network slice user charging device 102 in this embodiment of this application may be deployed in a CHF device (as shown in FIG. 1B) defined in the 3GPP specification.

It may be understood that, during actual application, FIG. 1A may include more network slice user charging devices.

Similarly, to avoid coordination between a plurality of network slice user charging devices, the network slice charging gateway may store a routing rule (including a correspondence between a user identifier and an address of the network slice user charging device), to send or route charging requests (for example, the foregoing third charging request message) for a same network slice user to a same network slice user charging device for processing.

The network slice instance 104 is a virtual network provided by an operator. The operator may lease the virtual network to a network slice customer, and the network slice customer provides the virtual network to an end user for use. Alternatively, the virtual network may be directly provided to an end user for use. A user equipment (for example, the user equipment 106) of an end user may access the virtual network, create a PDU session in the virtual network, and access a data service (for example, a service provided by an industry customer) based on the PDU session.

In addition to the session management device 105, the network slice instance may further include another network device, for example, an access management function (AMF) device defined in the 3GPP specification.

It may be understood that, during actual application, FIG. 1A may include more network slice instances, to meet requirements of a large quantity of end users and network slice customers.

The session management device 105 is located on the network slice instance 104, and is at least configured to manage a PDU session of the user equipment 106 on the network slice instance 104, and send the foregoing first charging request message to the network slice charging gateway 103, so that charging processing is performed for the PDU session. The session management device 105 may be further configured to control the PDU session (for example, forbid the user equipment 106 from using the PDU session or allow the user equipment 106 to use the PDU session) based on a charging processing result returned by the network slice charging gateway 103.

It may be understood that a function (referred to as a "session management function") of the session management device 105 in this embodiment of this application may be deployed in a session management function (SMF) device defined in the 3GPP specification, as shown in an SMF device in FIG. 1B.

It may be understood that, during actual application, the network slice instance 104 in FIG. 1A may include more session management devices. A session management device corresponding to the user equipment 106 is determined by a network accessed by the user equipment 106.

The user equipment 106 is a terminal device that can access a network slice instance, including but not limited to a mobile phone, a notebook computer, a communication terminal on a shared bicycle, a communication terminal on an internet of vehicles, a water/electricity/gas meter reading terminal, and the like. The user equipment 106 may establish a PDU session on the network slice instance 104, and access a data service (for example, a service provided by an industry customer) based on the PDU session. The user equipment 106 may be used by a corresponding user, and may belong to the user, or may not belong to the user in terms of property but belong to a corresponding network slice customer (a bicycle sharing scenario), or the like.

It may be understood that, during actual application, FIG. 1A may include more user equipments.

For ease of understanding of the embodiments of this application, the following describes several concepts related to network slicing.

A network slice customer is a customer that leases/subscribes to/purchases a network slice instance from an operator, and provides a service of the network slice customer to a network slice user (or a device of the network slice user) based on a leased/subscribed/purchased network slice instance. Alternatively, a large quantity of user equipments of the network slice customer can access a network by using the network slice instance, to implement a service of the network slice customer or enable a user equipment to use an SLA (Service Level Agreement) ensured network. Based on different service requirements, one network slice instance may be leased to only one network slice customer, or may be leased to a plurality of network slice customers at the same time. One network slice customer may lease only one network slice instance, or may lease a plurality of network slice instances at the same time.

A network slice user is an end user who accesses a network slice instance by using a terminal device. Based on different service requirements, a terminal device of a network slice user may access only one network slice instance, or may access a plurality of network slice instances at the same time. Based on different situations in which a terminal device used by the network slice user accesses the network slice instance, the network slice user may be classified into a network slice group user, a network slice individual user, a network slice hybrid user, and the like, which are separately described in the following.

Therefore, the user equipment 106 may belong to a network slice customer or a network slice user.

For ease of description, in this embodiment of this application, a network slice instance leased/sold by an operator to a network slice customer is referred to as a "wholesale network slice instance", a network slice instance directly provided by an operator to an end user without using a network slice customer is referred to as a "retail network slice instance", and a network slice instance leased/sold by an operator to a network slice customer and directly provided to an end user is referred to as a "hybrid network slice instance".

A network slice group user is an end user whose terminal device accesses only a wholesale network slice instance but not a retail network slice instance. For ease of description, the network slice group user may also be referred to as a "group user".

A network slice individual user is an end user whose terminal device accesses only a retail network slice instance but not a wholesale network slice instance. For ease of description, the network slice individual user may also be referred to as an "individual user".

A network slice hybrid user is an end user whose terminal device accesses both a wholesale network slice instance and a retail network slice instance (the terminal device may access the two types of network slice instances at the same time or at different times). For ease of description, the network slice hybrid user may also be referred to as a "hybrid user".

Figure 2:
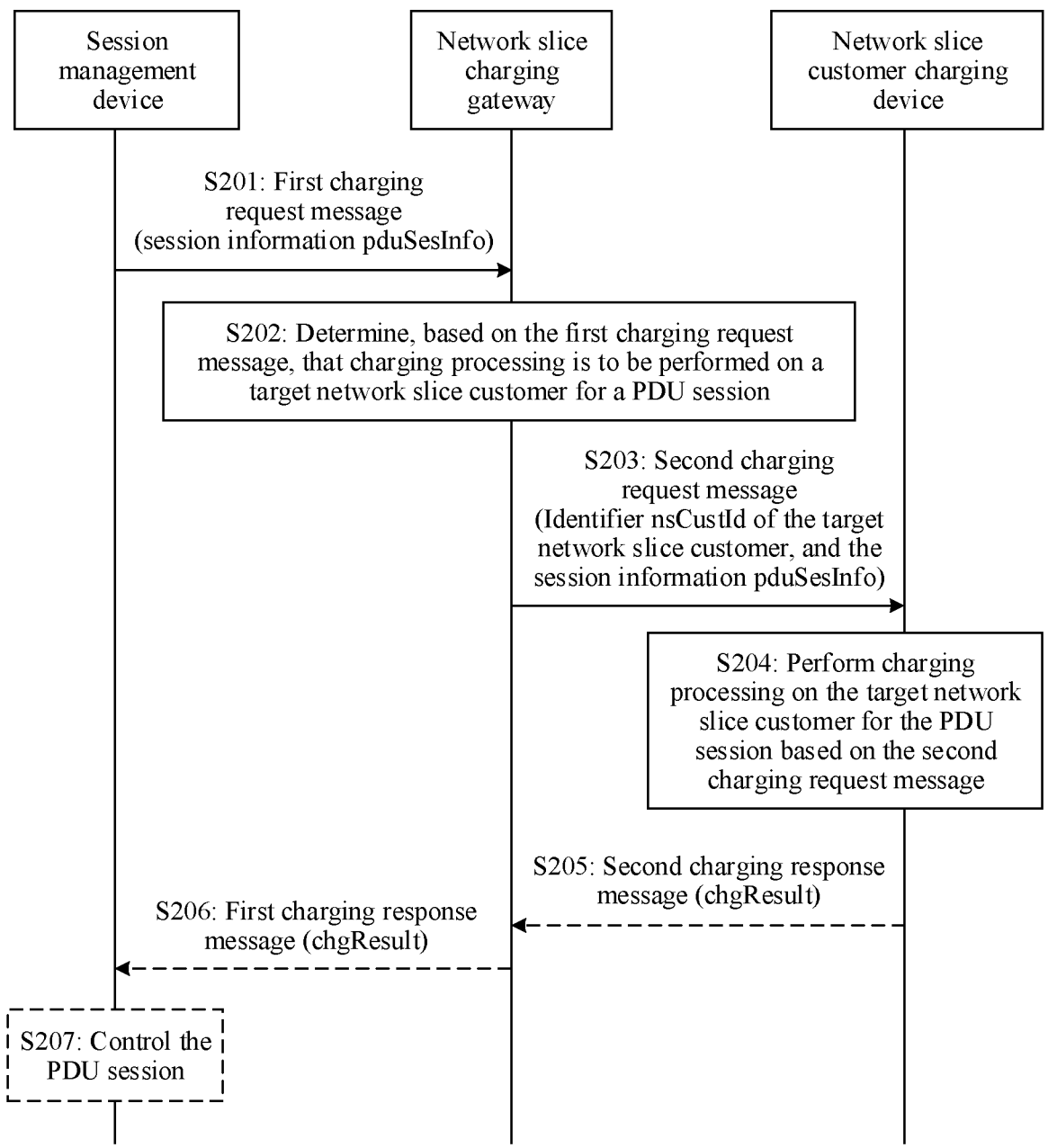
FIG. 2 is a flowchart of a method for performing charging processing on a network slice customer according to an embodiment of this application.

FIG. 2 is a flowchart of a method for performing charging processing on a network slice customer according to an embodiment of this application. The method procedure is implemented based on the architecture shown in FIG. 1A. A session management device corresponds to the session management device 105 in FIG. 1A, a network slice charging gateway corresponds to the network slice charging gateway 103 in FIG. 1A, and a network slice customer charging device corresponds to the network slice customer charging device 101 in FIG. 1A. In this method procedure, it is assumed that user equipment (for example, the user equipment 106) requests to establish a PDU session on a network slice instance (for example, the network slice instance 104) or has established a PDU session on a network slice instance. On this basis, that the session management device sends a charging request to the network slice charging gateway, to trigger the network slice charging gateway and the network slice customer charging device to perform charging processing for the PDU session, and control the PDU session based on a returned charging processing result specifically includes the following steps:

Step 201: The session management device sends a first charging request message to the network slice charging gateway, where the first charging request message includes session information pduSesInfo.

Specifically, the session management device may send the first charging request message to the network slice charging gateway when the user equipment requests to establish a PDU session or within a life cycle of the PDU session. A specific name of the first charging request message is not limited in this application, for example, may be a "PDU session charging initial request" or a "PDU session charging update request".

The session information pduSesInfo includes an attribute of the PDU session, and may specifically include one or more of the following attributes: a session identifier, an initial flag, a creation time, a user identifier, user location information, an identifier of a network slice instance, or a service identifier.

The session identifier pduSesId is used to identify the PDU session.

The initial flag initFlag is used to indicate that the PDU session is a newly created PDU session, or the PDU session is a PDU session for which no charging processing has been performed. Therefore, when sending the first charging request message to the network slice charging gateway for the PDU session for the first time, the session management device may carry the flag in pduSesInfo, and may not carry the flag when sending the first charging request message to the network slice charging gateway subsequently.

The creation time createTime is a time point at which the PDU session is created on the network slice instance. Whether the PDU session is a newly created PDU session or a PDU session for which no charging processing has been performed may be determined based on a time difference between the creation time and a current time. From this perspective, the creation time createTime may replace the initial flag initFlag.

The user identifier userId is used to identify user equipment (for example, the user equipment 106) corresponding to the PDU session or a user corresponding to the user equipment. The user identifier may be a mobile number, an email address, an IMSI (international mobile subscriber identity) of a mobile phone, an IMEI (international mobile equipment identity), an IP address of a mobile phone, or the like.

The user location information userLocation is a location of a user equipment (for example, the user equipment 106) corresponding to the PDU session, and may include longitude and latitude information.

The identifier of a network slice instance nsiId is used to identify a network slice instance (for example, the network slice instance 104) corresponding to the PDU session.

The service identifier serviceId is an identifier of a service carried by the PDU session.

Optionally, the first charging request message may further include service unit information suInfo, where the service unit information suInfo includes information required for requesting a service unit or a service data unit for the PDU session, or a quantity of service units that have been consumed or used in the PDU session. Specifically, the service unit information may include one or more of the following attributes: a used service unit quota, a requested service unit quota, or a used service unit quota.

The used service unit quota usedSU is a quantity of used service units in the PDU session, for example, used data traffic or duration, and may be recorded (for example, writing or storing a charging data record of a corresponding network slice customer, to subsequently calculate a fee payable to the network slice customer) in a charging device (for example, the network slice customer charging device).

The requested service unit quota reqSUQuota is a quantity of service units, for example, available data traffic or duration, for which the session management device requests the network slice charging gateway/network slice customer charging device to grant, for use in the PDU session.

The used service unit quota usedSUQuota is a used part of a service unit quota previously requested by the session management device for the PDU session (for example, if a granted service unit quota is 10 M and a remaining quota is 1 M, the used service unit quota is 9 M).

In a possible implementation, for example, in an online charging scenario, the used service unit quota usedSUQuota and the requested service unit quota reqSUQuota may be both carried in the service unit information suInfo, but the used service unit quota usedSU is not carried in suInfo. In another possible implementation, for example, in an offline charging scenario, the used service unit quota usedSU is carried in suInfo, and the used service unit quota usedSUQuota and the requested service unit quota reqSUQuota are not carried in suInfo.

Optionally, the session management device may determine, according to a policy and a charging control rule provided by a policy and charging rules function (PCRF) device or a policy control function (PCF) device or based on subscription information of the network slice customer, information included in the first charging request message. For example, if the session management device determines, according to the policy and the charging control rule or based on the subscription information of the network slice customer, that charging is to be performed based on a quantity of PDU sessions (without considering data traffic used in the PDU session), the first charging request message includes only pduSesInfo, and does not include suInfo. For another example, if the session management device determines, according to the policy and the charging control rule or based on the subscription information of the network slice customer, that charging is to be performed based on data traffic used in the PDU session (without considering a quantity of PDU sessions), the first charging request message includes pduSesInfo and the suInfo, and pduSesInfo does not include initFlag or createTime.

For example, a data structure of the first charging request message may be as follows:

```
FirstChargeRequest{
  pduSesInfo{
    "pduSesId":"pduSesId01"
    "initFlag":"true"
    "createTime":"2019-02-28 23:59:59"
    "userId":"1381234567"
    "userLocation":"X1 degrees east longitude, Y1 degrees
      north latitude"
    "nsiId":"nsiId01"
    "serviceId":"serviceId01"
```

-continued

```
  }
  suInfo{
    "reqSUQuota":"reqSUQuota01"
    "usedSUQuota":"usedSUQuota01" // reqSUQuota may also
      be carried
    "usedSU":"usedSU01" // this parameter is not carried when
      reqSUQuota
  and usedSUQuota are carried
  }
}
```

It may be understood that the data structure of the first charging request message may be in another form. For example, the first charging request message may alternatively be in the following form:

```
FirstChargeRequest{
  "pduSesId":"pduSesId01"
  "initFlag":"true"
  "createTime":"2019-02-28 23:59:59"
  "userId":"1381234567"
  "userLocation":"X1 degrees east longitude, Y1 degrees
    north latitude"
  "nsiId":"nsiId01"
  "serviceId":"serviceId01"
  "reqSUQuota":"reqSUQuota01"
  "usedSUQuota":"usedSUQuota01" // reqSUQuota may also
    be carried
  "usedSU":"usedSU01" // this parameter is not carried when
    reqSUQuota and
usedSUQuota are carried
}
```

It may be understood that, charging processing is not necessarily performed on the network slice customer for the PDU session used by the user equipment. For example, a charging rule may be as follows: When a service carried in the PDU session is a pre-specified service, charging processing is performed on a corresponding network slice customer. When another service is carried, charging processing is performed on the user. In this case, the first charging request message may include information required for performing charging processing on the corresponding network slice customer, and also include information required for performing charging processing on the user. Therefore, the first charging request message may include a plurality of pieces of pduSesInfo, or a plurality of combinations of pduSesInfo and suInfo.

Step 202: The network slice charging gateway determines, based on the first charging request message, that charging processing is to be performed on a target network slice customer for the PDU session.

Specifically, the network slice charging gateway receives the first charging request message, obtains the session information pduSesInfo from the first charging request message through parsing, and further determines, based on the first charging request message, that charging processing is to be performed on the target network slice customer for the PDU session. The target network slice customer is a network slice customer on which charging processing is to be performed for the PDU session, and may be a customer of the network slice instance (when one network slice instance is leased to only one network slice customer) or a customer that corresponds to the PDU session or the user equipment in customers of the network slice instance (when one network slice instance is leased to a plurality of network slice customers at the same time). In a possible scenario, the target network slice customer may be a network slice customer that should pay for the PDU session.

Specifically, the network slice charging gateway may determine, by using the following procedure, that charging processing is to be performed on the target network slice customer for the PDU session:

determining an identifier of the target network slice customer based on the first charging request message. For details, refer to any one of the following Method 1 to Method 5.

The determining that charging processing is to be performed on the target network slice customer for the PDU session is specifically: if the identifier of the target network slice customer exists or is not a null value (indicating that there is a network slice customer on which charging processing is to be performed for the PDU session), determining that charging processing is to be performed on the target network slice customer for the PDU session; or if the identifier of the target network slice customer does not exist or is a null value (indicating that there is no network slice customer on which charging processing is to be performed for the PDU session, and charging processing is to be performed on a corresponding user for the PDU session), determining that charging processing is to be performed on the user for the PDU session.

The foregoing process is a process of determining an object (which charging account) on which charging processing is to be performed. Optionally, the network slice charging gateway may further determine a specific device that is to perform charging processing (that is, determine an address of a device that performs charging processing). When charging processing is to be performed on the target network slice customer, the network slice charging gateway may determine that a default network slice customer charging device is to perform charging processing. (For example, an address of the default network slice customer charging device is obtained from preset configuration information. As shown in Table 1, an "ITEM" field is a configuration item, and a "VALUE" field is a value of the configuration item. That the address of the default network slice customer charging device is used is applicable to a scenario in which only one network slice customer charging device is deployed.) Alternatively, the network slice charging gateway may search, based on the foregoing determined identifier of the target network slice customer, a routing rule of the network slice customer charging device for an address of a network slice customer charging device corresponding to the target network slice customer. (For example, as shown in Table 2, a "CUSTID" field is an identifier of a network slice customer, and an "NSCCADDR" field is an address of a network slice customer charging device. According to the table, an address of a network slice customer charging device corresponding to a network slice customer may be found based on an identifier of the network slice customer. That the address of the network slice customer charging device corresponding to the identifier of the target network slice customer is used is applicable to a scenario in which a plurality of network slice customer charging devices are deployed.)

TABLE 1

| ITEM | VALUE |
| --- | --- |
| Address of the network slice customer charging device | http://ip1:port1 |

TABLE 2

| CUSTID | NSCCADDR |
| --- | --- |
| nsCustId001 | http://ip1:port1 |
| nsCustId002 | http://ip2:port2 |
| nsCustId003 | http://ip3:port3 |

The network slice charging gateway may use one of the following methods to determine the identifier of the target network slice customer based on different information included in pduSesInfo or different service rules preset by an operator.

(1) Method 1: Determine the Identifier nsCustId of the Target Network Slice Customer Based on the User Identifier userId in the Session Information pduSesInfo.

Specifically, the network slice charging gateway obtains first correspondence information. The first correspondence information includes correspondences between at least one group of user identifiers and identifiers of network slice customers that provide network slice instances for corresponding users, and the first correspondence information may be a database table (for example, the network slice charging gateway may obtain data in Table 3 from subscription data of the network slice customer). Each row of data in the table includes two fields: a "UID" field, used to store a user identifier, and a "CUSTID" field, used to store an identifier of a network slice customer that provides a network slice instance for a corresponding user (namely, a user corresponding to the user identifier).

Further, the network slice charging gateway may find, in the first correspondence information, a value of a "CUSTID" field in a data row in which a value of a "UID" field is equal to the user identifier userId in the session information pduSesInfo, and use the value of the "CUSTID" field as the identifier nsCustId of the target network slice customer. It may be understood that if an identifier nsCustId of a corresponding network slice customer cannot be found in the first correspondence information, the identifier nsCustId of the target network slice customer does not exist or is a null value, indicating that charging processing is to be performed on a user (a user whose identifier is userId in pduSesInfo, rather than a network slice customer), and a charging request should be sent to the network slice user charging device subsequently.

TABLE 3

| UID | CUSTID |
| --- | --- |
| userId001 | nsCustId007 |
| userId002 | nsCustId107 |
| userId099 | nsCustId209 |

Certainly, in this method, the session information pduSesInfo in step 201 includes at least the user identifier userId.

The method is applicable to at least the following scenario: The user equipment accesses only a wholesale network slice instance but not a retail network slice instance. In other words, the corresponding user is a pure network slice group user.

(2) Method 2: Determine the Identifier nsCustId of the Target Network Slice Customer Based on the User Identifier userId and the Identifier nsiId of a Network Slice Instance in the Session Information pduSesInfo.

Specifically, the network slice charging gateway further obtains second correspondence information in addition to the first correspondence information. The second correspondence information includes correspondences between identifiers of at least one group of network slice instances and identifiers of network slice customers leasing the network slice instances. The second correspondence information may be a database table. (As shown in Table 4, an identifier of one network slice instance corresponds to an identifier of only one network slice customer, but an identifier of one network slice customer may correspond to identifiers of a plurality of network slice instances. The network slice charging gateway may obtain data in the table from the subscription data of the network slice customer.) Each row of data in the table includes two fields: an "NSIID" field, used to store an identifier of a network slice instance, and a "CUSTID" field, used to store an identifier of a network slice customer that leases a corresponding network slice instance.

Further, the network slice charging gateway may find, in the first correspondence information, a value of a "CUSTID" field in a data row in which a value of the "UID" field is equal to the user identifier userId in the session information pduSesInfo, to obtain a set A. In addition, the network slice charging gateway finds, in the second correspondence information, a value of a "CUSTID" field in a data row in which the value of the "NSID" field is equal to the identifier nsiId of the network slice instance in the session information pduSesInfo, to obtain a set B. The set A includes identifiers of all network slice customers that provide a network slice instance to a user whose identifier is userId in pduSesInfo. The set B includes identifiers of all network slice customers that lease network slice instances whose identifiers are nsiId in pduSesInfo. An intersection of the set A and the set B is used as the identifier nsCustId of the target network slice customer.

It may be understood that if the set A is an empty set, it indicates that a user whose identifier is userId in pduSesInfo is an "individual user", and further indicates that charging processing is to be performed on the user (a user whose identifier is the userId in pduSesInfo, rather than a network slice customer), and that subsequently the charging request may be directly sent to the network slice user charging device without obtaining the set B. If the set A is not an empty set, but the intersection of the set A and the set B is an empty set, the identifier nsCustId of the target network slice customer does not exist (or is a null value). This indicates that a user whose identifier is userId in pduSesInfo is a "hybrid user", and a network slice instance currently used by the user is a retail network slice instance. This further indicates that charging processing is to be performed on the user, and that the charging request should also be sent to the network slice user charging device subsequently.

TABLE 4

| NSIID | CUSTID |
| --- | --- |
| nsiId03 | nsCustId007 |
| nsiId05 | nsCustId107 |
| nsiId94 | nsCustId209 |

Certainly, in this method, the session information pduSesInfo in step 201 includes at least the user identifier userId and the identifier nsiId of the network slice instance.

The method is applicable to at least the following scenario: Each network slice instance is leased to only one network slice customer, the network slice customer may lease a single network slice instance or a plurality of network slice instances, and a user corresponding to the device is a "hybrid user" (the user equipment may access both the wholesale network slice instance and the retail network slice instance).

(3) Method 3: Determine the Identifier nsCustId of the Target Network Slice Customer Based on the User Identifier userId, the Identifier nsiId of the Network Slice Instance, and a Creation Time createTime of the PDU Session in the Session Information pduSesInfo.

Specifically, the network slice charging gateway further obtains third correspondence information in addition to the first correspondence information. The third correspondence information includes correspondences between identifiers of at least one group of network slice instances, identifiers of a network slice customer that leases/subscribes to the corresponding network slice instances, and a leasing/subscription time range. The third correspondence may be a database table (as shown in Table 5, the network slice charging gateway may obtain data in the table from the subscription data of the network slice customer). Each row in the table includes three fields: an "NSIID" field, used to store an identifier of a network slice instance, a "CUSTID" field, used to store an identifier of a network slice customer that leases/subscribes to a corresponding network slice instance, and a "TIMERNG" field, used to store a corresponding leasing/subscription time range.

Further, in addition to obtaining the foregoing set A, the network slice charging gateway may further find, in the third correspondence information, a value of a "CUSTID" field in a data row in which the value of the "NSIID" field is equal to the value of nsiId in the session information pduSesInfo and a value of a "TIMERNG" field covers createTime in the session information pduSesInfo, to obtain a set C. The set A includes identifiers of all network slice customers that provide a network slice instance to a user whose identifier is userId in pduSesInfo. The set C includes identifiers of all network slice customers that lease/subscribe to a network slice instance whose identifier is nsiId in the session information pduSesInfo, and whose leasing/subscription time range covers createTime in the session information. An intersection of the set A and the set C is used as the identifier nsCustId of the target network slice customer.

It may be understood that, similar to Method 2, if the set A is an empty set, it indicates that a corresponding user is an "individual user", and that the charging request may be directly sent to the network slice user charging device without obtaining the set C. If the set A is not an empty set, but the intersection of the set A and the set C is an empty set, the identifier nsCustId of the target network slice customer does not exist or is a null value. This indicates that a corresponding user is a "hybrid user", but a network slice instance currently used by the user is a retail network slice instance. It further indicates that charging processing is to be performed on the user (a user whose identifier is userId in pduSesInfo, rather than a network slice customer), and that the charging request should also be sent to the network slice user charging device subsequently.

TABLE 5

| NSIID | CUSTID | TIMERNG |
| --- | --- | --- |
| nsiId03 | nsCustId007 | 2019Q1 |
| nsiId03 | nsCustId008 | 2019Q2 |
| nsiId03 | nsCustId009 | 2019Q3 |

Certainly, in this method, the session information pduSesInfo in step 201 includes at least the user identifier userId, the identifier nsiId of the network slice instance, and the creation time createTime of the PDU session.

The method is applicable to at least the following scenario: Each network slice instance may be leased/sold to different network slice customers at different times (for example, a network slice instance is leased to a network slice customer A in a first quarter and leased to a network slice customer B in a second quarter). In other words, a plurality of network slice customers may share a same network slice instance at different times, and a user corresponding to the user equipment is a "hybrid user" (the user equipment may access both the wholesale network slice instance and the retail network slice instance).

(4) Method 4: Determine the Identifier nsCustId of the Target Network Slice Customer Based on the User Identifier userId, the Identifier nsiId of the Network Slice Instance, and a Time at which the First Charging Request Message is Received in the Session Information pduSesInfo.

The method is similar to Method 3, except that the time at which the first charging request message is received replaces the creation time of the PDU session. Because a PDU session may last for a long time, compared with Method 3 (based on the creation time of the PDU session), this method (based on the time at which the first charging request message is received) can maximize charging accuracy, and avoid a case in which the user equipment can still access the network slice instance after a leasing/subscription time range is exceeded. In this way, a loss to an operator is avoided.

Certainly, in this method, the session information pduSesInfo in step 201 includes at least the user identifier userId and the identifier nsiId of the network slice instance, and may not include the creation time createTime of the PDU session.

(5) Method 5: Determine the Identifier nsCustId of the Target Network Slice Customer Based on the User Identifier userId, the Identifier nsiId of the Network Slice Instance, and the Service Identifier serviceId in the Session Information pduSesInfo.

Specifically, the network slice charging gateway further obtains fourth correspondence information in addition to the first correspondence information. The fourth correspondence information includes correspondences between identifiers of at least one group of network slice instances, an identifier of a network slice customer that leases/subscribes to a corresponding network slice instance, and an identifier of a service carried on the corresponding leased/subscribed network slice instance. The fourth correspondence may be a database table (as shown in Table 6, the network slice charging gateway may obtain data in the table from the subscription data of the network slice customer). Each row of data in the table includes three fields: an "NSIID" field, used to store the identifier of the network slice instance, a "CUSTID" field, used to store the identifier of the network slice customer that leases/subscribes to a corresponding network slice instance, and a "SERVICEID" field, used to store the identifier of the service carried on the leased/subscribed network slice instance.

Further, in addition to obtaining the set A, the network slice charging gateway may further find, in the fourth correspondence information, a value of a "CUSTID"s field in a data row in which a value of the "NSIID" field is equal to nsiId in the session information pduSesInfo and a value of the "SERVICEID" field is equal to serviceId in pduSesInfo, to obtain a set D. The set A includes identifiers of all network slice customers that provide a network slice instance to a user whose identifier is userId in pduSesInfo. The set D includes identifiers of all network slice customers that lease/subscribe to the network slice instance whose identifier is nsiId in pduSesInfo and are used to carry a service corresponding to serviceId in pduSesInfo. An intersection of the set A and the set D is used as the identifier nsCustId of the target network slice customer.

It may be understood that, similar to Method 3, if the set A is an empty set, it indicates that the corresponding user is an "individual user", and the charging request may be directly sent to the network slice user charging device without obtaining the set D. If the set A is not an empty set, but the intersection of the set A and the set D is an empty set, the target network slice customer (whose identifier is nsCustId) does not exist. This indicates that a corresponding user is a "hybrid user", but a network slice instance currently used by the user is a retail network slice instance or a hybrid network slice instance (the PDU session does not carry a service specified by serviceId in pduSesInfo). It further indicates that charging processing is to be performed on the user (a user whose identifier is userId in pduSesInfo, rather than a network slice customer), and that the charging request should be sent to the network slice user charging device subsequently.

TABLE 6

| NSIID | CUSTID | SERVICEID |
| --- | --- | --- |
| nsiId03 | nsCustId007 | serviceId007 |
| nsiId03 | nsCustId008 | serviceId008 |
| nsiId03 | nsCustId009 | serviceId009 |

Certainly, in this method, the session information pduSesInfo in step 201 includes at least the user identifier userId, the identifier nsiId of the network slice instance, and the service identifier serviceId.

The method is applicable to at least the following scenario: Each network slice instance is leased to a plurality of network slice customers at the same time but different network slice customers require different services carried on the network slice instance, the network slice customer may lease a single network slice instance or a plurality of network slice instances, and a user corresponding to the user equipment is a hybrid user (the user equipment may access both the wholesale network slice instance and the retail network slice instance).

Optionally, the network slice charging gateway may determine, according to the policy and the charging control rule provided by the PCRF device or the PCF device or based on the subscription information of the network slice customer, to use a specific method to determine the identifier of the target network slice customer. For example, if it is determined that all network slices of the operator are hybrid network slice instances, Method 5 is used.

Step 203: The network slice charging gateway sends a second charging request message to the network slice customer charging device, where the second charging request message includes the identifier nsCustId of the target network slice customer and the session information pduSesInfo. Optionally, if the first charging request message includes service unit information suInfo, the second charging request message may further include the service unit information suInfo, so that the network slice customer charging device performs charging processing on the target network slice customer based on pduSesInfo and suInfo.

Specifically, the network slice charging gateway sends the second charging request message to the network slice customer charging device based on a result (that is, charging processing is to be performed on the target network slice customer for the PDU session, the address of the network slice customer charging device that performs charging processing is provided, and so on) determined in step 202. A specific name of the second charging request message is not limited in this application, for example, may be a "network slice customer charging request".

Optionally, the network slice charging gateway may determine the address of the network slice customer charging device based on preconfigured information. For example, the preconfigured information may include a correspondence between the identifier of the network slice customer and the address of the network slice customer charging device. Therefore, when there are a plurality of network slice customer charging devices, the network slice charging gateway may send, based on the configuration information, the second charging request message to a network slice customer charging device corresponding to the identifier nsCustId of the target network slice customer.

For example, a data structure of the second charging request message may be as follows:

```
SecondChargeRequest{
    "targetNSCustId":"nsCustId01"
    pduSesInfo{
        "pduSesId":"pduSesId01"
        "initFlag":"true"
        "createTime":"2019-02-28 23:59:59"
        "userId":"1381234567"
        "userLocation":"X1 degrees east longitude, Y1 degrees
        north latitude"
        "nsiId":"nsiId01"
        "serviceId":"serviceId01"
    }
    suInfo{
        "reqSUQuota":"reqSUQuota01"
        "usedSUQuota":"usedSUQuota01" // reqSUQuota may also
        be carried
        "usedSU":"usedSU01" // this parameter is not carried when
        reqSUQuota
    and usedSUQuota are carried
    }
}
```

It may be understood that the data structure of the second charging request message may be in another form. For example, the second charging request message may alternatively be in the following form:

```
SecondChargeRequest{
    "targetNSCustId":"nsCustId01"
    "pduSesId":"pduSesId01"
    "initFlag":"true"
    "createTime":"2019-02-28 23:59:59"
    "userId":"1381234567"
    "userLocation":"X1 degrees east longitude, Y1 degrees
    north latitude"
    "nsiId":"nsiId01"
    "serviceId":"serviceId01"
    "reqSUQuota":"reqSUQuota01"
    "usedSUQuota":"usedSUQuota01" // reqSUQuota may also
    be carried
    "usedSU":"usedSU01" // this parameter is not carried when
    reqSUQuota and
usedSUQuota are carried
}
```

Step 204: The network slice customer charging device performs charging processing on the target network slice customer for the PDU session based on the second charging request message.

Specifically, the network slice customer charging device receives the second charging request message, obtains the identifier nsCustId of the target network slice customer, the session information pduSesInfo, and the service unit information suInfo (if any) from the second charging request message through parsing, and performs charging processing based on nsCustId, pduSesInfo, and suInfo (if any).

Specifically, if the second charging request message includes nsCustId, pduSesInfo, and suInfo, the network slice customer charging device may perform charging processing on (record a used service unit quota, grant a service unit quota based on an available service unit quantity, or the like) the target network slice customer based on pduSesInfo and suInfo. If the second charging request message includes nsCustId and pduSesInfo but does not include suInfo, the network slice customer charging device may perform charging processing (charging based on a quantity of PDU connections or a quantity of subscribers) based on service information (the service identifier or the like), user information (the user identifier, the user location information, or the like), or the subscription information in pduSesInfo. Specifically, there are at least the following several cases:

(1) The second charging request message includes the identifier nsCustId of the target network slice customer, the session information pduSesInfo, and the service unit information suInfo.

(1.1) If the service unit information suInfo includes a used service unit quota usedSU, the charging processing process includes the following steps:

The network slice customer charging device writes or stores the identifier of the target network slice customer, the session information pduSesInfo, and the used service unit quota usedSU in a charging data record of the target network slice customer.

Optionally, the network slice customer charging device may further send a processing result of the used service unit quota to the network slice charging gateway by using step 205, to indicate that the used service unit quota has been written or stored in the corresponding charging data record.

(1.2) If the service unit information suInfo includes a requested service unit quota reqSUQuota and the used service unit quota usedSUQuota, the charging processing process includes the following steps:

The network slice customer charging device obtains (for example, obtains from the subscription data of the network slice customer), based on the identifier nsCustId of the target network slice customer and the session information pduSesInfo, an available service unit quantity, where the available service unit quantity is a quantity of service units that can be used for the PDU session, or is a quantity of service units that can be used for the PDU session in an account of the target network slice customer. In a possible scenario, the target network slice customer may allocate the available service unit quantity based on the user identifier. For example, assuming that 100 G traffic is available, the 100 G traffic may be allocated to 100 users, and each user may receive an equal amount of traffic or an unequal amount of traffic. The network slice customer charging device may determine, based on userId in the session information pduSesInfo, an available service unit quantity (traffic) corresponding to userId. In another possible scenario, the target network slice customer may allocate an available service unit quantity based on a geographic location. For example, assuming that there is 100 G traffic, 60 G traffic may be allocated to a user in a geographic area 1, 30 G traffic may be allocated to a user in a geographic area 2, and 10 G traffic may be allocated to a user in a geographic area 3. The network slice customer charging device may determine, based on userLocation in the session information pduSesInfo, an available service unit quantity (traffic) corresponding to userLocation. The foregoing scenario is merely an example scenario, and is not exhaustive or limited.

The network slice customer charging device deducts the used service unit quota usedSUQuota from the available service unit quantity, to obtain a remaining available service unit quantity.

The network slice customer charging device determines a granted service unit quota based on the requested service unit quota reqSUQuota and the remaining available service unit quantity (for example, if the requested service unit quota is 5 M, and the remaining available service unit quantity is 20 M, the granted service unit quota may be 5 M).

Optionally, the network slice customer charging device may further send the granted service unit quota to the network slice charging gateway by using step 205.

When a plurality of network slice charging gateways send second charging request messages for a same network slice customer to a same network slice customer charging device, the network slice customer charging device may perform processing in the following method to improve system performance:

The network slice customer charging device splits an available service unit quantity of the same network slice customer into a plurality of small pieces of data, where each small piece of data includes a part of the available service unit quantity (For example, a total available service unit quantity of the network slice customer is 1 G traffic and is evenly split into 1024 pieces of data, and each piece of data includes 1 M traffic); and starts an access module for each small piece of data to manage access to the corresponding small piece of data (process second charging request messages sent by one or more network slice charging gateways).

In addition, the network slice customer charging device starts a coordination module, configured to coordinate management of the plurality of small pieces of data. For example, when an available service unit quantity of a small block is used up, the coordination module selects one or more small blocks that are not used up, and combines remaining available service unit quantities of the blocks and re-splits a combined quantity. For another example, when the total available service unit quantity of the network slice customer changes, (for example, the available service unit quantity is restored after monthly settlement, or the network slice customer subscribes to an additional available service unit quantity) the coordination module may adjust available service unit quantities in the plurality of small pieces of data.

When the network slice customer needs to obtain an overall usage/consumption status of an available service unit quantity subscribed by the network slice customer, the network slice customer may use the coordination module to summarize or count up used service unit quantities of all users of the network slice customer, or use the coordinate module to summarize or count up used parts of the plurality of small pieces of data.

The network slice customer charging device determines, based on information such as a size of the subscribed available service unit quantity, a concurrent quantity, or a quantity of the users of the network slice customer, a quantity of small pieces of data and sizes of parts of the available service unit quantity included in the small pieces of data; and further determines a quantity of access modules and coordination modules.

(2) The second charging request message includes the identifier nsCustId of the target network slice customer and the session information pduSesInfo, but does not include the service unit information suInfo.

(2.1) If the session information pduSesInfo includes the initial flag initFlag, the charging processing process includes the following steps:

The network slice customer charging device obtains a subscribed quantity of PDU sessions of the target network slice customer. For example, the network slice customer charging device obtains subscription data of the target network slice customer based on nsCustId, and obtains the subscribed quantity of PDU sessions of the target network slice customer from the subscription data. The subscribed quantity of PDU sessions is an upper limit of a total quantity of PDU sessions used by all user equipments of the target network slice customer in a charging period.

The network slice customer charging device calculates an updated PDU session quantity of the target network slice customer based on the initial flag initFlag, where the updated PDU session quantity is a quantity of actual PDU sessions of the target network slice customer in a current charging period. For example, starting from a start moment of a charging period, for each received second charging request message, if pduSesInfo in the second charging request message includes an initial flag initFlag, a PDU session corresponding to pduSesInfo is considered as a new PDU session. Then, the updated PDU session quantity is increased by one, to obtain the updated PDU session quantity through accumulation by a current time of the current charging period.

It may be understood that a process in which the network slice customer charging device obtains the subscribed quantity of PDU sessions of the target network slice customer may alternatively be performed after the updated PDU session quantity of the target network slice customer is calculated. The execution order is not limited in this embodiment of this application.

If the network slice customer charging device determines that the updated PDU session quantity does not reach the subscribed quantity of PDU sessions, the network slice customer charging device may send, to the network slice charging gateway by using step 205, indication information indicating to continue or maintain the PDU session.

If the network slice customer charging device determines that the updated PDU session quantity reaches the subscribed quantity of PDU sessions, the network slice customer charging device may send, to the network slice charging gateway by using step 205, indication information indicating to terminate the PDU session (for example, a response message carries error code indicating access rejection), so that the network slice charging gateway terminates the PDU session. This prevents the target network slice customer from overusing the network slice instance, and reduces a risk of the operator.

(2.2) If the session information pduSesInfo includes the creation time createTime of the PDU session, the charging processing process differs from Case (2.1) in that, whether a PDU session is a new PDU session is determined based on the creation time instead of initFlag, and details are described as follows:

The network slice customer charging device calculates an updated PDU session quantity of the target network slice customer based on the creation time createTime of the PDU session. For example, the network slice customer charging device may calculate a time difference delta between the creation time create Time of the PDU session and a current time, when delta is less than a preset threshold, determine that the PDU session is a new PDU session, and further increase the updated PDU session quantity by one. In this way, the updated PDU session quantity is obtained through accumulation.

In addition to the foregoing difference, for other parts of the charging processing process, refer to Case (2.1).

(2.3) If pduSesInfo includes the user identifier userId, the charging processing process may include the following steps:

The network slice customer charging device obtains a subscribed quantity of the target network slice customer. For example, the network slice customer charging device obtains the subscriber quantity (the data may usually be obtained from subscription data) of the target network slice customer based on the identifier nsCustId of the target network slice customer. The subscriber quantity is an upper limit (the upper limit is generally determined based on an order or a subscription contract) of a quantity of users of the target network slice customer in a charging period.

The network slice customer charging device calculates the updated user quantity of the target network slice customer based on the user identifier userId. For example, the network slice customer charging device may store, from a start moment of a charging period, a user identifier carried in each second charging request message without repetition, and count up a quantity of these user identifiers as the updated user quantity of the target network slice customer.

It may be understood that a process in which the network slice customer charging device obtains the subscribed quantity of the target network slice customer may alternatively be performed after the updated user quantity of the target network slice customer is calculated. The execution order is not limited in this embodiment of this application.

If the network slice customer charging device determines that the updated user quantity of the target network slice customer does not reach the subscribed quantity of the target network slice customer, the network slice charging device sends, to the network slice charging gateway by using step 205, an instruction for continuing the PDU session. The indication information indicating to continue the PDU session is used to indicate the network slice charging gateway to notify the session management device to control the PDU session: continue or maintain the PDU session, to ensure that the user equipment can continue to access a data service by using the PDU session.

If the network slice customer charging device determines that the updated user quantity of the target network slice customer reaches the subscribed quantity of the target network slice customer, the network slice customer charging device may send, to the network slice charging gateway by using step 205, indication information indicating to terminate the PDU session. The indication information indicating to terminate the PDU session is used to indicate the network slice charging gateway to notify the session management device to control the PDU session: terminate the PDU session, so that the user equipment cannot continue to access a data service by using the PDU session.

Optionally, when the second charging request message does not include suInfo, the network slice customer charging device may select one foregoing charging processing manner in Case (2.1), Case (2.2), or Case (2.3) based on preset configuration information. For example, the preset configuration information may be "when the second charging request message does not include the service unit information, a default charging processing manner is to perform charging processing based on the updated user quantity of the target network slice customer", indicating that charging processing is performed according to Case (2.3).

Step 205: The network slice customer charging device returns a second charging response message to the network slice charging gateway, where the second charging response message includes a charging processing result chgResult.

This step is an optional step. The charging processing result may include different content based on different charging processing processes in step 204:

a processing result of the used service unit quota, corresponding to Case (1) in step 204;

a granted service unit quota, corresponding to Case (1.2) in step 204; and indication information indicating to continue/maintain a PDU session or indication information indicating to end a PDU session (for example, the response message carries error code indicating access rejection) corresponding to Case (2.1), Case (2.2), or Case (2.3) in step 204.

Step 206: The network slice charging gateway returns a first charging response message to the session management device, where the first charging response message includes the charging processing result chgResult.

Step 207: The session management device controls the PDU session.

Specifically, the session management device performs different control on the PDU session based on different charging processing results chgResult. For example, if chgResult includes indication information indicating to end the PDU session, the session management device ends the PDU session.

According to the charging processing method corresponding to FIG. 2, when a large quantity of user equipments of a same network slice customer concurrently trigger charging requests to a plurality of session management devices, and then the plurality of session management devices concurrently initiate charging requests to a plurality of network slice charging gateways, the plurality of network slice charging gateways can transfer some charging processing tasks to a same network slice customer charging device for execution. In this way, load of the network slice charging gateways can be shared, and performance of each network slice charging gateway can be improved by avoiding coordination between the plurality of network slice charging gateways. In addition, because charging processing for a same network slice customer is performed on a same network slice customer charging device, a charging processing error can be avoided, and accuracy of charging processing performed on the network slice customer can be improved.

As described above, referring to FIG. 1B, functions of the session management device, the network slice charging gateway, and the network slice customer charging device may be deployed in a charging architecture defined in the 3GPP specification, to resolve a technical problem similar to the foregoing problem in the charging architecture defined in the 3GPP specification. Therefore, an embodiment of this application provides an architecture of a charging system shown in FIG. 3 and a flowchart of a method for performing charging processing on a network slice customer shown in FIG. 4A and FIG. 4B.

Figure 3:
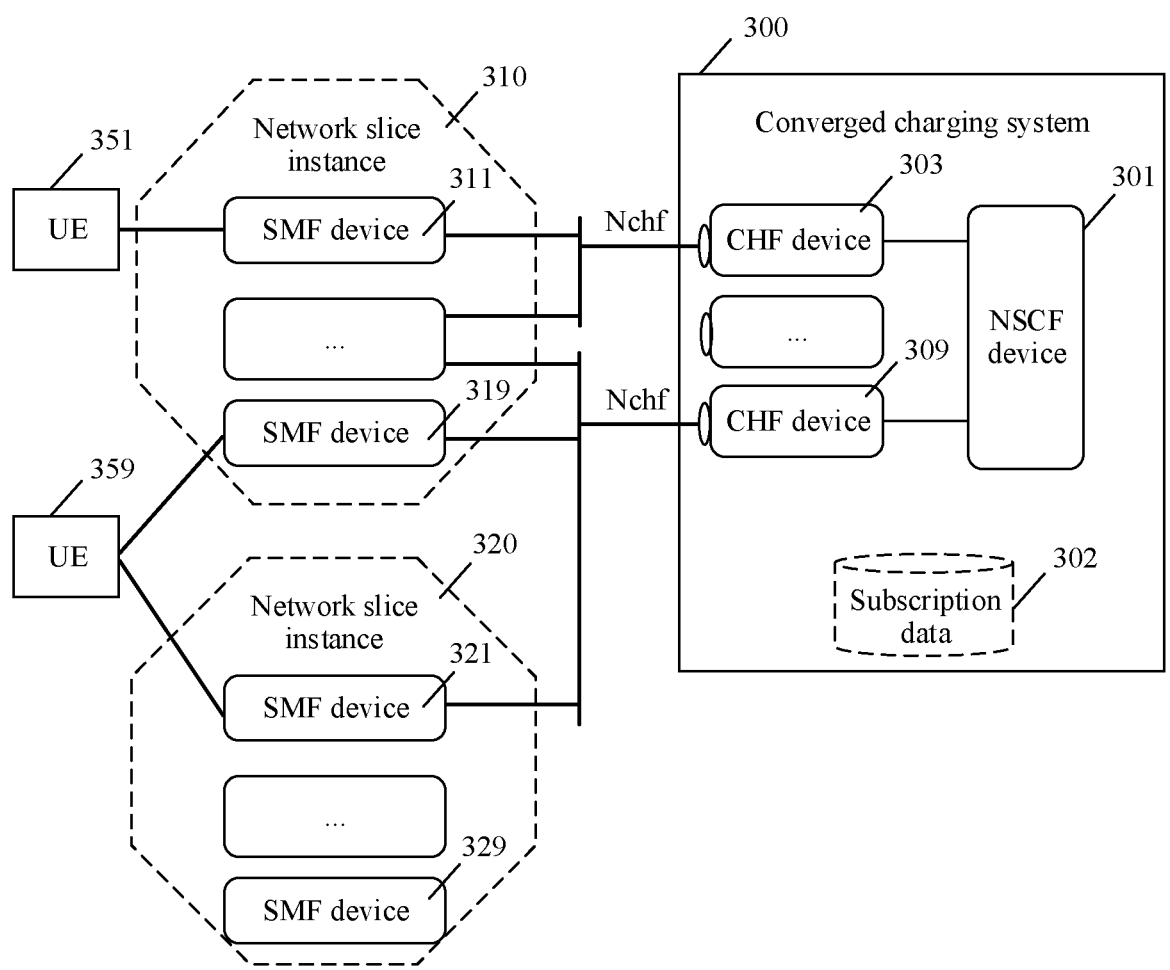
FIG. 3 is an architectural diagram of still another charging system according to an embodiment of this application.

FIG. 3 is an architectural diagram of another charging system according to an embodiment of this application. The charging system includes a converged charging system 300, a plurality of network slice instances including a network slice instance 310 and a network slice instance 320, and a plurality of UEs including user equipment (UE) 351 and UE 359.

The converged charging system 300 is responsible for performing charging processing on the UE for a used network slice instance, and includes an NSCF device 301, a subscription data storage device 302, and a plurality of CHF devices (including a CHF device 303 and a CHF device 309). Each CHF device includes functions of the network slice charging gateway and the network slice user charging device in FIG. 2, and is configured to receive a charging request from a corresponding SMF device, and send a charging request related to a network slice customer to the NSCF device 301 for processing. A charging request related to a network slice user is locally processed (that is, processed by a network slice user charging function module. For details, reference may be made to FIG. 1B). A same CHF device may be connected to SMF devices in a same network slice instance, or may be connected to SMF devices in different network slice instances. The NSCF device 301 includes a function of the network slice customer charging device in FIG. 2, and is configured to perform charging processing on each network slice customer based on the charging request sent by the CHF device and subscription data in the subscription data storage device 302. The subscription data storage device 302 may not be included in the convergent charging system 300 (for example, a subscription system, which is not shown in FIG. 3). Alternatively, the subscription data may be copied or synchronized from another device outside the system to the convergent charging system 300. Then, the convergent charging system 300 is configured to provide subscription data of the network slice customer to the NSCF device 301 and the CHF device (including a subscription time range, a subscribed quantity of PDU sessions, a subscriber quantity, a quantity of subscribed service units, and the like in the foregoing embodiment), and then the NSCF device 301 performs charging processing. There may be a plurality of NSCF devices 301 to share load, and each NSCF device is responsible for performing charging processing on some network slice customers. Therefore, configuration information similar to that shown in Table 2 needs to be configured on each CHF device. In this way, charging requests for a same network slice customer may be sent to a same NSCF device for processing.

The network slice instance 310 includes a plurality of SMF devices such as an SMF device 311 and an SMF device 319. The network slice instance 320 may also include a plurality of SMF devices (or may include a single SMF device), such as an SMF device 321 and an SMF device 329. SMF devices in a same network slice instance may be connected to a same CHF device, or may be connected to different CHF devices, and SMF devices in different network slice instances may be connected to a same CHF device. Each SMF device sends, to a corresponding CHF device, PDU session-related information and service unit information (optional) of the UE in a corresponding network slice instance, so that the CHF device performs corresponding charging processing. Then, the SMF device controls the PDU session based on a charging processing result returned by the CHF device.

The UE may create a PDU session in a single network slice instance, or may create a PDU session in a plurality of network slice instances. Therefore, one UE may correspond to one SMF device, or may correspond to a plurality of SMF devices. For example, the UE 351 corresponds to the SMF device 311, and the UE 359 corresponds to the SMF device 319 and the SMF device 321.

Figure 4A:
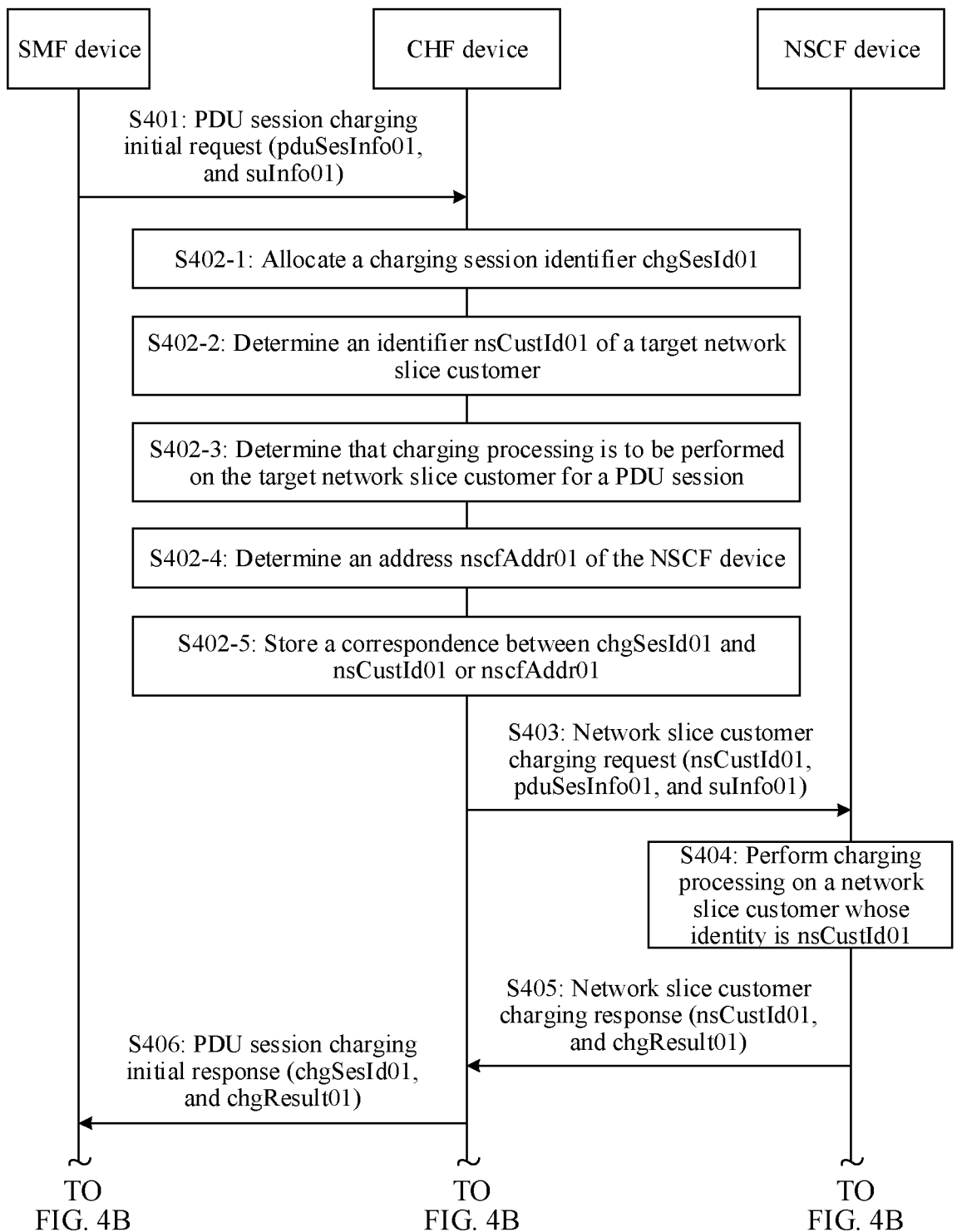
FIG. 4A and FIG. 4B are a flowchart of another method for performing charging processing on a network slice customer according to an embodiment of this application.
Figure 4B:
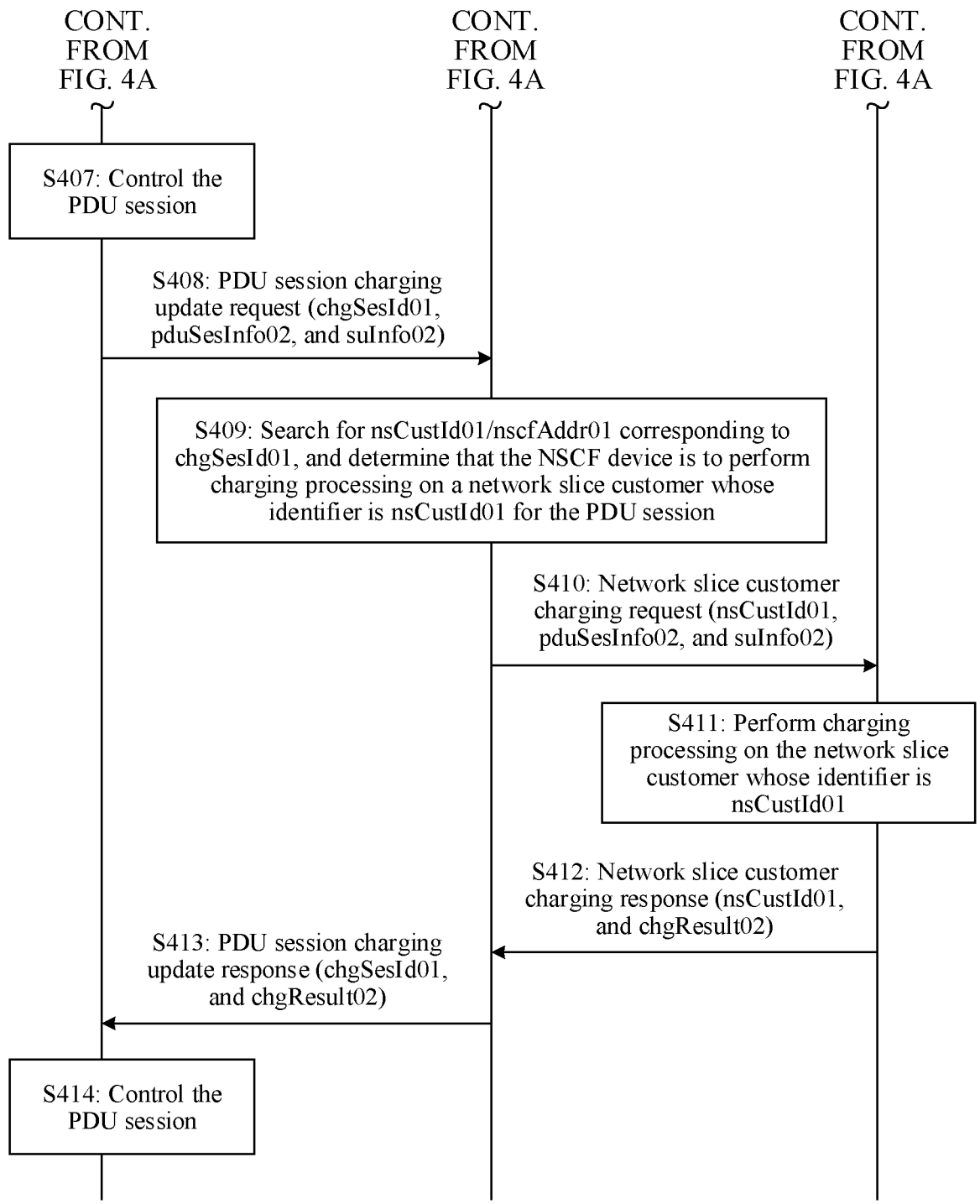

FIG. 4A and FIG. 4B are a flowchart of another method for performing charging processing on a network slice customer according to an embodiment of this application. The method procedure is implemented based on the architecture of the charging system shown in FIG. 3. An SMF device corresponds to the SMF device 311, the SMF device 319, the SMF device 321, the SMF device 329, and the like in FIG. 3, and a CHF device corresponds to the CHF device 303, the CHF device 309, and the like in FIG. 3. An NSCF device corresponds to the NSCF device 301 in FIG. 3. In this method procedure, it is assumed that UE (the UE 351 or the UE 359) is requesting or has established a PDU session in a network slice instance (the network slice instance 310 or the network slice instance 320). In this case, the SMF device sends related information used for charging processing to the CHF device, to trigger the CHF device and the NSCF device to perform charging processing on the PDU session; and controls the PDU session based on a charging processing result. The following steps are specifically included.

Step 401: The SMF device sends a PDU session charging initial request to the CHF device, where the PDU session charging initial request includes session information pduSesIno01 and service unit information suInfo01.

For the pduSesIno01 and the suInfo01, refer to the descriptions in the method procedure corresponding to FIG. 2.

It may be understood that step 402-1 may alternatively be performed after step 402-2 or step 402-3.

Step 402-1: The CHF device allocates a charging session identifier chgSesId01.

Specifically, the CHF device creates a charging session between the SMF device and the CHF device based on the received PDU session charging initial request message, and allocates the unique identifier chgSesId01 to the charging session. The charging session identifier is sent to the SMF device when a response message to the PDU session charging initial request is subsequently returned to the SMF device.

Step 402-2: The CHF device determines an identifier nsCustId01 of a target network slice customer.

For this step, refer to step 202 in the method procedure corresponding to FIG. 2.

Step 402-3: The CHF device determines that charging processing is to be performed on the target network slice customer for the PDU session.

Specifically, if the CHF device determines that the nsCustId01 exists or is not a null value, the CHF device accordingly determines that perform charging processing on the target network slice customer for the PDU session (namely, a network slice customer whose identifier is nsCustId01).

Step 402-4: The CHF device determines an address nscfAddr01 of the NSCF device.

Steps 402-3 is a process in which the CHF device determines that charging processing is to be performed on the target network slice customer. Optionally, the CHF device may further determine a device that is to perform charging processing. Similar to step 202 in the method procedure corresponding to FIG. 2, the CHF device may determine that charging processing is to be performed by a default NSCF device, or may determine that the NSCF device corresponding to the nsCustId01 performs charging processing. For example, the CHF device may determine, according to the foregoing routing rule (referring to Table 2) or the like and based on the nsCustId01, the address nscfAddr01 of the NSCF device (a network slice customer charging device) corresponding to the nsCustId01, so that charging processing requests for a same network slice customer is sent to a same NSCF device (if there are a plurality of NSCF devices), and the same NSCF device executes the charging processing process.

On the contrary, if the CHF device determines that the nsCustId01 does not exist or is a null value, it indicates that charging processing is to be performed on a user of the corresponding UE. In this case, the CHF device performs charging processing on the user locally (through a network slice user charging module).

Steps 402-5: The CHF device stores a correspondence between the charging session identifier chgSesId01 and the identifier nsCustId01 of the target network slice customer and/or the address nscfAddr01 of the NSCF device.

For example, the CHF device may store the charging session identifier chgSesId01 and the identifier of the target network slice customer in a database table. As shown in Table 7, a "CHGSESID" field is used to store an identifier of a charging session, a "TGTCUSTID" field is used to store an identifier of a target network slice customer, and an "NSCFADDR" field is used to store an address of an NSCF device. In this way, the following process can be avoided: The CHF device repeatedly determines an identifier of the target network slice customer and an address of the NSCF device when subsequently receiving a charging request that includes a same charging session identifier, and then indicates "the NSCF device to perform charging processing on the target network slice customer for the PDU session".

TABLE 7

| CHGSESID | TGTCUSTID | NSCFADDR |
|---|---|---|
| chgSesId01 | custId002 | http://ip1:port1 |
| chgSesId02 | custId009 | http://ip2:port2 |
| chgSesId01 | custId123 | http://ip3:port3 |

Step 403: The CHF device sends a network slice customer charging request to the NSCF device, where the network slice customer charging request includes the identifier nsCustId01 of the target network slice customer, the session information pduSesInfo01, and the service unit information suInfo01.

For this step, refer to step 203 in the method procedure corresponding to FIG. 2.

Step 404: The NSCF device performs charging processing on the target network slice customer.

For this step, refer to step 204 in the method procedure corresponding to FIG. 2.

It is assumed that a requested service unit quota reqSUQuota included in the suInfo01 is 5 M, a used service unit quota usedSUQuota is 4.5 M, and a current remaining available service unit quantity of a network slice customer (namely, the target network slice customer) corresponding to the nsCustId01 obtained by the NSCF device is 9.5 M. In this case, the NSCF device updates the remaining available service unit quantity as follows: 9.5 M (the current remaining available service unit quantity)−4.5 M (the used service unit quota)=5 M (not less than the requested service unit quota reqSUQuota), and a service unit quota that can be granted is determined as 5 M.

Step 405: The NSCF device returns a network slice customer charging response to the CHF device, where the network slice customer charging response includes a charging processing result chgResult01.

For this step, refer to step 205 in the method procedure corresponding to FIG. 2.

According to the example in step 404, the chgResult01 includes information indicating that the granted service unit quota is 5 M.

Optionally, the network slice customer charging response may further include the identifier nsCustId01 of the target network slice customer.

Step 406: The CHF device returns a PDU session charging initial response to the SMF device, where the PDU session charging initial response includes the charging processing result chgResult01.

For this step, refer to step 206 in the method procedure corresponding to FIG. 2.

Optionally, the PDU session charging initial response may further include the charging session identifier chgSesId01.

Step 407: The SMF device controls the PDU session.

For this step, refer to step 207 in the method procedure corresponding to FIG. 2.

According to the example in step 404, because the SMF device receives the granted service unit quota (5 M), control performed by the SMF device on the PDU session is "continuing or maintaining the PDU session".

Step 408: The SMF device sends a PDU session charging update request to the CHF device, where the PDU session charging update request includes the charging session identifier chgSesId01, session information pduSesIno02, and service unit information suInfo02.

For example, when the granted service unit quota (5 M) received in step 406 has been used up or is about to be used up, the SMF device sends the PDU session charging update request to the CHF device. The pduSesIno02 and the pduSesIno01 may include a same PDU session identifier and other information that may be the same or different. The suInfo02 and the suInfo01 may be the same or different. It is assumed that a requested service unit quota reqSUQuota included in suInfo02 is 3 M and a used service unit quota usedSUQuota is 5 M (which indicates that the previously granted quota of 5 M has been used up).

Step 409: The CHF device searches for the identifier nsCustId01 of the target network slice customer corresponding to the chgSesId01 and/or the address nscfAddr01 of the NSCF device, and determines that charging processing is to be performed by the NSCF device on the network slice customer whose identifier is nsCustId01 for the PDU session.

For example, the CHF device may search Table 7 for a value of the "TGTCUSTID" field in a data row in which a value of the "CHGSESID" field is equal to the chgSesId01, and use the value of the "TGTCUSTID" field as the identifier nsCustId01 of the target network slice customer and a value of the "NSCFADDR" field as the address nscfAddr01 of the NSCF device. An advantage of this is that the CHF device does not need to repeatedly perform a process of determining the identifier of the target network slice customer and a process of determining the address of the NSCF device (the network slice customer charging device) in step 402-2 or step 202, thereby improving performance of the CHF device.

Step 410: The CHF device sends a network slice customer charging request to the NSCF device, where the network slice customer charging request includes the identifier nsCustId01 of the target network slice customer, session information pduSesInfo02, and the service unit information suInfo02.

For this step, refer to step 403.

Step 411: The NSCF device performs charging processing on the target network slice customer.

For this step, refer to step 404.

According to the example in step 404, the NSCF device determines that a remaining available service unit quantity of the network slice customer corresponding to the nsCustId01 has been deducted as: 5 M (a current remaining available service unit quantity)−5 M (a used service unit quota)=0 M. In this case, it may be determined that a service unit quota that can be granted is 0 M.

Step 412: The NSCF device returns a network slice customer charging response to the CHF device, where the network slice customer charging response includes a charging processing result chgResult02.

For this step, refer to step 405.

According to the example in step 404, the chgResult02 includes information indicating that the service unit quota that can be granted is 0 M.

Step 413: The CHF device returns a PDU session charging update response to the SMF device, where the PDU session charging update response includes the charging processing result chgResult02.

For this step, refer to step 406.

Step 414: The SMF device controls the PDU session.

For this step, refer to step 407.

According to the example in step 404, because the received granted service unit quota is 0 M, control performed by the SMF device on the PDU session is "terminating the PDU session".

It may be understood that if the PDU session charging initial request in step 401 or the PDU session charging update request in step 408 does not include the service unit information (the suInfo01 or the suInfo02), correspondingly, the network slice customer charging request in step 403 or step 410 does not include the corresponding service unit information (the suInfo01 or the suInfo02). Therefore, when performing charging processing on the PDU session, the NSCF device may perform charging processing based on an updated PDU session quantity of the target network slice customer (ensuring that the updated PDU session quantity of the target network slice customer does not exceed a subscribed quantity of PDU sessions of the target network slice customer). Alternatively, the NSCF performs charging processing based on an updated user quantity (ensuring that the updated user quantity of the target network slice customer does not exceed a subscribed quantity of the target network slice customer). A specific manner that is used to perform charging processing may be determined according to a preset configuration rule or information included in the pduSesInfo01 or the pduSesInfo02. For details, refer to Case (2) in step 204.

According to the charging processing method corresponding to FIG. 4A and FIG. 4B, when a large quantity of user equipments of a same network slice customer concurrently trigger charging requests to a plurality of SMF devices, and the plurality of SMF devices concurrently initiate charging requests to a plurality of CHF devices, the plurality of CHF devices may execute a charging processing task related to a common user (a network slice user), and allocate a charging processing task related to the network slice customer to an NSCF device for execution. In this way, load of the CHF device can be reduced, and performance of each CHF device can be improved by avoiding coordination between the plurality of CHF devices. In addition, because charging processing for a same network slice customer is performed on a same NSCF device, a charging processing error can be avoided, and accuracy of charging processing performed on the network slice customer can be improved.

Figure 5:
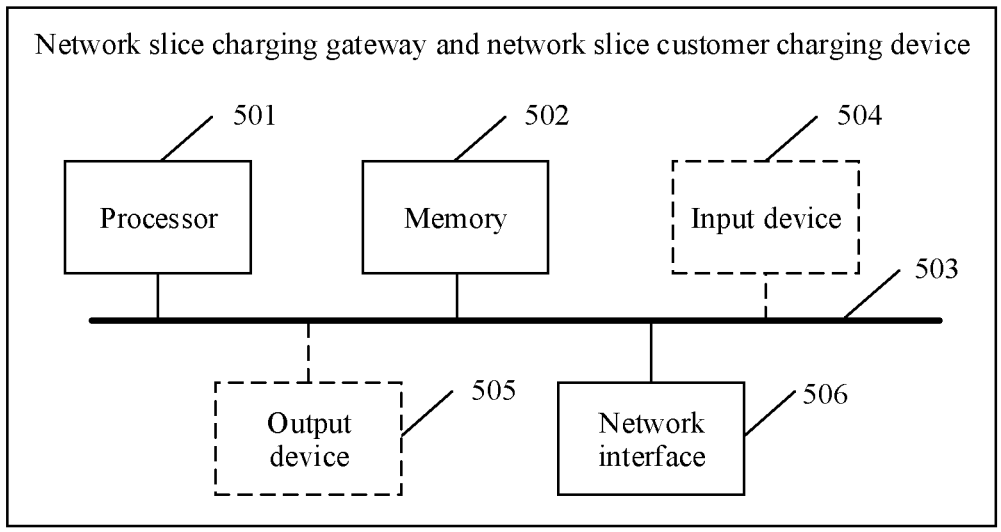
FIG. 5 is a diagram of a hardware structure of a network slice charging gateway or a network slice customer charging device according to an embodiment of this application.

FIG. 5 is a diagram of a hardware structure of a network slice charging gateway or a network slice customer charging device according to an embodiment of this application. All network slice charging gateways in this embodiment of this application (for example, 103 in FIGS. 1A and 303 in FIG. 3) and all network slice customer charging devices (for example, 101 in FIGS. 1A and 301 in FIG. 3) may use general-purpose computer hardware shown in FIG. 5, including a processor 501, a memory 502, a bus 503, an input device 504, an output device 505, and a network interface 506. The input device 504 and the output device 505 are optional.

Specifically, the memory 502 may include a computer storage medium in a form of a volatile memory and/or a nonvolatile memory, for example, a read-only memory and/or a random access memory. The memory 502 can store an operating system, an application program, another program module, executable code, and program data.

The input device 504 may be configured to input information, so that a system administrator operates and manages the network slice charging gateway, the network slice customer charging device, and the like. For example, the system administrator configures an address of a corresponding network slice customer charging device on the network slice charging gateway, and configures an address of a subscription data storage device on the network slice customer charging device. The input device 504 may be a keyboard or a pointing device, for example, a mouse, a trackball, a touchpad, a microphone, a joystick, a game pad, a satellite television antenna, a scanner, or the like. These input devices may be connected to the processor 501 through the bus 503.

The output device 505 may be configured to output information, so that the system administrator operates and manages the network slice charging gateway, the network slice customer charging device, and the like. In addition to a monitor, the output device 505 may be another peripheral output device, for example, a speaker and/or a printing device. These output devices may also be connected to the processor 501 through the bus 503.

The network slice charging gateway or the network slice customer charging device may be connected to a network, for example, a local area network (LAN), through the network interface 506. In a web-connected environment, a computer-executable instruction stored in these devices is not limited to being locally stored, but may be stored in a remote storage device.

When the processor 501 executes executable code or an application program stored in the memory 502, the network slice charging gateway may perform method steps corresponding to the network slice charging gateway or a device that deploys/includes a function of the network slice charging gateway in all the foregoing embodiments, for example, steps 202, 203, 402-2, 402-3, and 409. For a specific execution process, refer to the foregoing embodiment, and details are not described herein again.

When the processor 501 executes the executable code or the application program stored in the memory 502, the network slice customer charging device may perform method steps corresponding to the network slice customer charging device or a device that deploys/includes a function of the network slice customer charging function in all the foregoing embodiments, for example, steps 204, 404, and 411. For a specific execution process, refer to the foregoing embodiment, and details are not described herein again.

Figure 6:
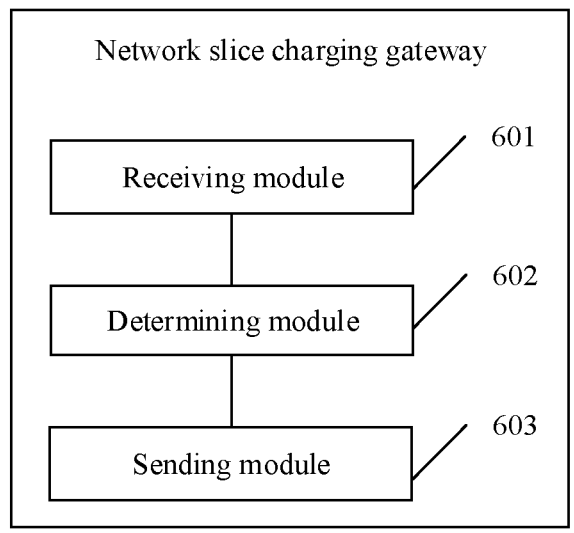
FIG. 6 is a schematic structural diagram of a network slice charging gateway according to an embodiment of this application.

FIG. 6 is a schematic structural diagram of a network slice charging gateway according to an embodiment of this application. The network slice charging gateway includes: a receiving module 601, a determining module 602, and a sending module 603.

The receiving module 601 is configured to receive a first charging request message from a session management device, where the first charging request message includes session information and service unit information (optional). The session information includes at least one attribute of a protocol data unit PDU session of a user equipment on a network slice instance; and the service unit information includes information used by the session management device to request a service unit or a service data unit for the PDU session or a quantity of service units that have been consumed or used in the PDU session. For other functions and a more specific execution process, refer to step descriptions, for example, steps 201 and 401, on a network slice charging gateway side or a CHF device side in the foregoing embodiments.

The determining module 602 is configured to determine, based on the first charging request message, that charging processing is to be performed on a target network slice customer for the PDU session, where the target network slice customer is a network slice customer on which charging processing is to be performed for the PDU session. For other functions and a more specific execution process, refer to step descriptions, for example, steps 202 and 402-3, on the network slice charging gateway side or the CHF device side in the foregoing embodiments.

The sending module 603 is configured to send a second charging request message to a network slice customer charging device, where the second charging request message includes an identifier of the target network slice customer, the session information, and the service unit information (optional). For other functions (for example, returning a charging processing result to a session management function device) and a more specific execution process, refer to step descriptions, for example, steps 203 and 403, on the network slice charging gateway side or the CHF device side in the foregoing embodiments.

In this embodiment, the network slice charging gateway is presented in a form of a functional module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the network slice charging gateway may alternatively use the form shown in FIG. 5. Both the receiving module 601 and the determining module 602 may be implemented by using the processor 501 and the memory 502 in FIG. 5. For example, a function of determining, by the determining module 602, that charging processing is to be performed on the target network slice customer may be implemented by the processor 501 by executing code stored in the memory 502.

Figure 7:
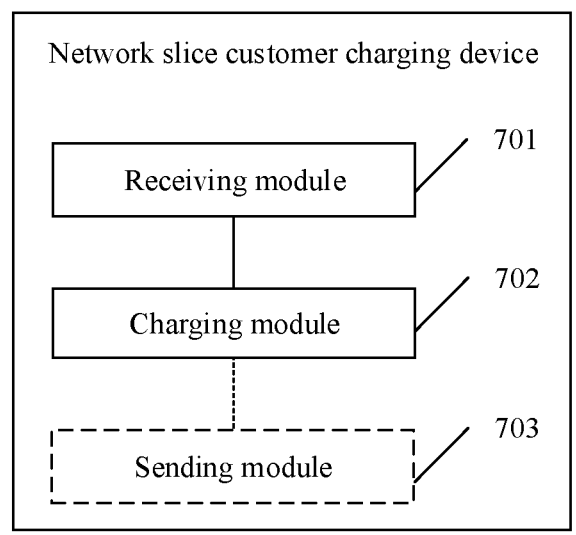
FIG. 7 is a schematic structural diagram of a network slice customer charging device according to an embodiment of this application.

FIG. 7 is a schematic structural diagram of a network slice customer charging device according to an embodiment of this application. The network slice customer charging device includes: a receiving module 701, a charging module 702, and a sending module 703.

The receiving module 701 is configured to receive a second charging request message from a network slice charging gateway, where the second charging request message includes an identifier of a target network slice customer, session information, and service unit information (optional). The session information includes at least one attribute of a protocol data unit PDU session of a user equipment on a network slice instance, and the service unit information includes information used by the session management device to to request a service unit or a service data unit for the PDU session or information used by the session management device to report a quantity of service units that have been consumed or used in the PDU session. The target network slice customer is a network slice customer on which charging processing is to be performed for the PDU session. For other functions and a more specific execution process, refer to step descriptions, for example, steps 203, 204, 403, and 404, on a network slice customer charging device side or an NSCF device side in the foregoing embodiments.

The charging module 702 is configured to perform charging processing on the target network slice customer based on the second charging request message. For other functions and a more specific execution process, refer to step descriptions, for example, steps 204, 404, and 411, on the network slice customer charging device or the NSCF device side in the foregoing embodiments.

The sending module 703 is an optional module, configured to send a charging processing result to the network slice charging gateway or a CHF device. For other functions and a more specific execution process, refer to step descriptions, for example, steps 205, 405, and 412, on the network slice customer charging device side or the NSCF device side in the foregoing embodiments.

In this embodiment, the network slice customer charging device is presented in a form of a functional module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the network slice customer charging device may alternatively use the form shown in FIG. 5. The receiving module 701, the charging module 702, and the sending module 703 may all be implemented by using the processor 501 and the memory 502 in FIG. 5. For example, a function of performing charging processing, by the charging module 702, on the network slice customer may be implemented by the processor 501 by executing code stored in the memory 502.

A person of ordinary skill in the art may be aware that, the units and algorithm steps in the examples described with reference to the embodiments disclosed in this specification may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person of ordinary skill in the art that, for ease and brief description, for a detailed working process of the foregoing system, apparatus, and unit, refer to a corresponding process in the foregoing method embodiments, and details are not described herein again.

In the several embodiments provided in this application, It may be understood that the disclosed system, apparatus, and method may be implemented in other manners. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual needs to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of the software functional unit and sold or used as an independent product, the integrated unit may be stored in a computer-readable storage medium. Based on such an understanding, the technical solutions in this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk drive, a read-only memory, a random access memory, a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A system for performing charging processing on a network slice customer, comprising: a session management device, a network slice charging gateway, and a network slice customer charging device, wherein
   the session management device is configured to:
      send a first charging request message to the network slice charging gateway, wherein the first charging request message comprises session information, and the session information comprises an attribute of a protocol data unit (PDU) session of a user equipment on a network slice instance;
   the network slice charging gateway is configured to:
      receive the first charging request message from the session management device;
      determine, based on the first charging request message, that charging processing is to be performed on a target network slice customer for the PDU session, wherein the determining that charging process is to be performed on the target network slice customer comprises determining an identifier of the target network slice customer based on the first charging request message; and
      send a second charging request message to the network slice customer charging device, wherein the second charging request message comprises the identifier of the target network slice customer and the session information; and
   the network slice customer charging device is configured to:
      receive the second charging request message from the network slice charging gateway; and
      perform charging processing on the target network slice customer for the PDU session based on the second charging request message.

2. The system according to claim 1, wherein the first charging request message and the second charging request message further comprise service unit information, and the service unit information comprises information used by the session management device to request a service unit for the PDU session or information used by the session management device to report a quantity of used service units in the PDU session.

3. The system according to claim 1, wherein
   the network slice customer charging device is further configured to send a charging processing result to the network slice charging gateway; the network slice charging gateway is further configured to receive the charging processing result from the network slice customer charging device, and send the charging processing result to the session management device; and
   the session management device is further configured to receive the charging processing result from the network slice charging gateway, and control the PDU session based on the charging processing result.

4. The system of claim 1, wherein the second charging request message further comprises service unit information, and the service unit information comprises information to request a service unit for the PDU session or to report a quantity of used service units in the PDU session.

5. A method for performing charging processing on a network slice customer, used in a network slice charging gateway, and comprising:
   receiving a first charging request message from a session management device, wherein the first charging request message comprises session information, and the session information comprises an attribute of a protocol data unit (PDU) session of a user equipment on a network slice instance;
   determining, based on the first charging request message, that charging processing is to be performed on a target network slice customer for the PDU session, wherein the determining that charging process is to be performed on the target network slice customer comprises determining an identifier of the target network slice customer based on the first charging request message; and
   sending a second charging request message to a network slice customer charging device, wherein the second charging request message comprises the identifier of the target network slice customer and the session information.

6. The method according to claim 5, wherein before the sending the second charging request message to the network slice customer charging device, the method further comprises:
   determining an address of the network slice customer charging device.

7. The method according to claim 5, wherein the session information comprises a user identifier, and the determining the identifier of the target network slice customer based on the first charging request message comprises:
  determining the identifier of the target network slice customer based on the user identifier.

8. The method according to claim 5, wherein the session information comprises a user identifier and an identifier of the network slice instance, and the determining the identifier of the target network slice customer based on the first charging request message comprises:
  determining the identifier of the target network slice customer based at least on the user identifier and the identifier of the network slice instance.

9. The method according to claim 5, wherein the session information comprises a user identifier, an identifier of the network slice instance, and a creation time of the PDU session, and the determining the identifier of the target network slice customer based on the first charging request message comprises:
  determining the identifier of the target network slice customer based on the user identifier, the identifier of the network slice instance, and the creation time of the PDU session.

10. The method according to claim 5, wherein the session information comprises a user identifier, an identifier of the network slice instance, and a service identifier, and the determining the identifier of the target network slice customer based on the first charging request message comprises:
  determining the identifier of the target network slice customer based on the user identifier, the identifier of the network slice instance, and the service identifier.

11. The method according to claim 5, wherein
  the first charging request message and the second charging request message further comprise service unit information, and the service unit information comprises information to request a service unit for the PDU session or to report a quantity of used service units in the PDU session.

12. The method according to claim 11, wherein the service unit information comprises a requested service unit quota and a used service unit quota, and the method further comprises:
  receiving, from the network slice customer charging device, a service unit quota granted by the network slice customer charging device in response to the second charging request message, and sending the service unit quota to the session management device.

13. The method of claim 5, wherein the second charging request message further comprises service unit information, and the service unit information comprises information to request a service unit for the PDU session or to report a quantity of used service units in the PDU session.

14. A method for performing charging processing on a network slice customer, used in a network slice customer charging device, and comprising:
  receiving a second charging request message from a network slice charging gateway, wherein the second charging request message comprises an identifier of a target network slice customer, session information, and service unit information, wherein the session information comprises an attribute of a protocol data unit (PDU) session of a user equipment on a network slice instance, and wherein the service unit information comprises information to request a service unit for the PDU session or to report a quantity of used service units in the PDU session; and
  performing charging processing on the target network slice customer for the PDU session based on the second charging request message including the session information and the service unit information.

15. The method according to claim 14, wherein the service unit information comprises a used service unit quota, and the used service unit quota is a quantity of used service units in the PDU session; and the performing charging processing on the target network slice customer for the PDU session based on the session information and the service unit information comprises:
  storing the identifier of the target network slice customer, the session information, and the used service unit quota in a charging data record of the target network slice customer.

16. The method according to claim 14, wherein the service unit information comprises a requested service unit quota and a used service unit quota, and the performing charging processing on the target network slice customer for the PDU session based on the session information and the service unit information comprises:
  deducting the used service unit quota from an available service unit quantity of the target network slice customer, to obtain a remaining available service unit quantity of the target network slice customer;
  determining a granted service unit quota based on the requested service unit quota and the remaining available service unit quantity of the target network slice customer; and
  sending the granted service unit quota to the network slice charging gateway.

17. The method according to claim 14, wherein the session information comprises an initial flag, and the initial flag is used to indicate that the PDU session is a newly created PDU session or a PDU session for which no charging processing has been performed; and the performing charging processing on the target network slice customer for the PDU session based on the second charging request message comprises:
  calculating an updated PDU session quantity of the target network slice customer based on the identifier of the target network slice customer and the initial flag.

18. The method according to claim 14, wherein the session information comprises a start time of the PDU session, and the performing charging processing on the target network slice customer for the PDU session based on the second charging request message comprises:
  calculating an updated PDU session quantity of the target network slice customer based on the identifier of the target network slice customer and the start time of the PDU session.

19. The method according to claim 14, wherein the performing charging processing on the target network slice customer for the PDU session based on the second charging request message comprises:
  determining that the updated PDU session quantity of the target network slice customer reaches a subscribed PDU session quantity of the target network slice customer; and
  sending indication information indicating to terminate the PDU session to the network slice charging gateway;
  or further comprises:
  determining that the updated PDU session quantity of the target network slice customer does not reach a subscribed PDU session quantity of the target network slice customer; and sending indication information indicating to maintain the PDU session to the network slice charging gateway.

20. The method according to claim 14, wherein the session information comprises a user identifier, and the performing charging processing on the target network slice customer for the PDU session based on the second charging request message comprises:
- calculating an updated user quantity of the target network slice customer based on the user identifier;
- determining that the updated user quantity of the target network slice customer reaches a subscribed user quantity of the target network slice customer; and
- sending indication information indicating to terminate the PDU session to the network slice charging gateway;

or comprises:
- calculating an updated user quantity of the target network slice customer based on the user identifier;
- determining that the updated user quantity of the target network slice customer does not reach a subscribed user quantity of the target network slice customer; and
- sending indication information indicating to maintain the PDU session to the network slice charging gateway.

* * * * *